US006985913B2

(12) United States Patent
Murata

(10) Patent No.: US 6,985,913 B2
(45) Date of Patent: Jan. 10, 2006

(54) ELECTRONIC BOOK DATA DELIVERY APPARATUS, ELECTRONIC BOOK DEVICE AND RECORDING MEDIUM

(75) Inventor: Yoshiyuki Murata, Ome (JP)

(73) Assignee: Casio Computer Co. Ltd., Tokyo (JP)

( * ) Notice: Subject to any disclaimer, the term of this patent is extended or adjusted under 35 U.S.C. 154(b) by 505 days.

(21) Appl. No.: 10/023,410

(22) Filed: Dec. 18, 2001

(65) Prior Publication Data

US 2002/0087555 A1 Jul. 4, 2002

(30) Foreign Application Priority Data

Dec. 28, 2000 (JP) ............................ 2000-402269
Oct. 18, 2001 (JP) ............................ 2001-320690

(51) Int. Cl.
*G06F 17/00* (2006.01)

(52) U.S. Cl. ...................... 707/104.1; 707/10; 434/317

(58) Field of Classification Search .................... 707/1, 707/10, 100, 101, 104.1; 345/901, 738–739; 715/706, 709; 434/178, 180, 317, 318, 308, 434/309

See application file for complete search history.

(56) References Cited

U.S. PATENT DOCUMENTS 5,663,748 A * 9/1997 Huffman et al. ............ 345/173
5,761,485 A 6/1998 Munyan
5,810,604 A * 9/1998 Kopp et al. ................. 434/317
5,954,515 A 9/1999 Iggulden
6,246,672 B1 * 6/2001 Lumelsky ................... 370/310
6,544,040 B1 * 4/2003 Brelis et al. ................ 434/236
6,683,611 B1 * 1/2004 Cleveland ................... 345/471
2001/0014895 A1 * 8/2001 Sappal ....................... 707/500
2002/0184189 A1 * 12/2002 Hay et al. ...................... 707/1

FOREIGN PATENT DOCUMENTS

JP 05-333891 A 12/1993
JP 2000099308 A * 4/2000
KR 1999-0075892 A 10/1999
KR 2000-24096 B1 5/2000
KR 000058503 A 10/2000

* cited by examiner

*Primary Examiner*—Hosain Alam
*Assistant Examiner*—Brian Goddard
(74) *Attorney, Agent, or Firm*—Frishauf, Holtz, Goodman & Chick, P.C.

(57) ABSTRACT

An electronic book device receives from an external delivery source book data representing the contents of a book, a reciter images, for example, of famous persons who read aloud the contents of the book based on the received book data, and the corresponding reciter voice data, and then displays the received book data and reciter images on the display. A user views the received book data and reciter images displayed on the display and causes the reciter images to read the book data aloud in voices represented by the reciter voice data.

14 Claims, 12 Drawing Sheets

Figures 5, 6:
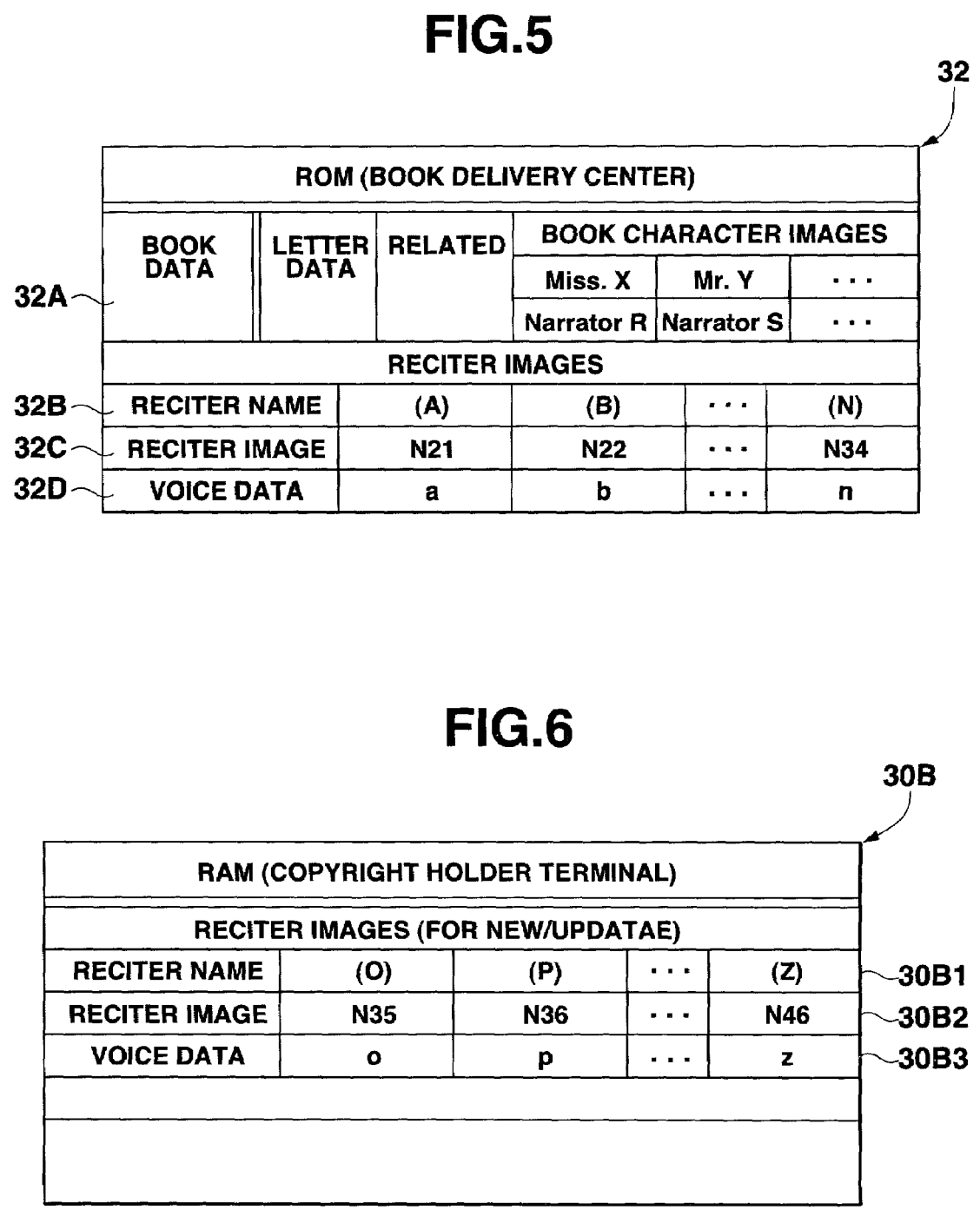

| | ROM (BOOK DELIVERY CENTER) | | | | |
|---|---|---|---|---|---|
| 32A | BOOK DATA | LETTER DATA | RELATED | BOOK CHARACTER IMAGES | |
| | | | | Miss. X | Mr. Y | . . . |
| | | | | Narrator R | Narrator S | . . . |

| | RECITER IMAGES | | | | |
|---|---|---|---|---|---|
| 32B | RECITER NAME | (A) | (B) | . . . | (N) |
| 32C | RECITER IMAGE | N21 | N22 | . . . | N34 |
| 32D | VOICE DATA | a | b | . . . | n |

| RAM (COPYRIGHT HOLDER TERMINAL) | | | | | |
|---|---|---|---|---|---|
| RECITER IMAGES (FOR NEW/UPDATAE) | | | | | |
| RECITER NAME | (O) | (P) | . . . | (Z) | 30B1 |
| RECITER IMAGE | N35 | N36 | . . . | N46 | 30B2 |
| VOICE DATA | o | p | . . . | z | 30B3 |
| | | | | | |
| | | | | | |

ELECTRONIC BOOK DATA DELIVERY APPARATUS, ELECTRONIC BOOK DEVICE AND RECORDING MEDIUM

FIELD OF THE INVENTION

The present invention relates to electronic book data delivery apparatus, electronic book device and recording mediums for reproducing the content of a book in a voice of a desired famous person or voice actor or actress.

BACKGROUND ART

Recently, letters, voices and images are increasingly electronized. Mobile terminals have been developed which reproduce so-called multimedia data composed of combined electronized letters, voices and images from second terminals through a network such as telephone lines or the Internet or via communication means. One of such mobile terminals is an electronic book device that reproduces electronized book data in a specified voice.

The electronic book device comprises a storage medium that stores electronized book data, a liquid crystal display unit, a manual input unit that selects desired book data and/or turns the page, and a controller that controls the respective elements of the book device. When desired book data is selected at the input unit, the controller reads the selected book data from the storage medium, and displays the data on a first page thereof on the display unit. When an instruction of page turning is given at the input unit, the data on a next page is selected and displayed on the display unit.

Compared to a conventional book made of paper, the electronic book device restricts consumption of resources and is capable of storing data of a plurality of book data. Thus, it is convenient to carry about and to manage the book. Since the electronic book device has such various advantages, the development of electronic book devices has recently advanced rapidly.

Like the conventional books made of paper, the electronic book device, however, only offer letter and/or image data to a user so as to visually read the data. Therefore, the book device is poor in expressiveness. Thus, realization of richer expressiveness provided by a combination of letters, voice, and images is desired.

Books range from stories/novels made mainly of letters to cartoon or comic made mainly of mixed images and letters. In the case of a cartoon or comic, many letters and images are displayed on one page, so that in the portable electronic book device letters and images displayed on the display screen are difficult to view dearly due to a restricted size of the screen.

As the portable telephones and other terminals have diffused, a user frequently carries an electronic book device of the above type and many other wearable devices about the user. Therefore, it is desired to improve the operability of the respective devices to be carried about in tie simultaneous usage of the functions of the respective devices and the convenience of carrying the devices. The electronic book devices have several aspects to be improved further.

It is therefore an object of the present invention to provide an electronic book data delivery apparatus, an electronic book device and a recording medium that are capable of reading the content of a book aloud in the voices of reciters who include well-known persons, voice actors/actress, etc.

Another object of the present invention is to provide an electronic book data delivery apparatus, an electronic book device and a recording medium that are capable of obtaining anywhere and anytime images and voice data of reciters who include the famous persons, voice actors/actresses, etc., that read the content of a book aloud, and causing a desired one of those images to be displayed and to recite the content of the book aloud in its voice.

A further object of the present invention is to provide an electronic book data delivery apparatus, an electronic book device and a recording medium that are capable of reading aloud the contents of a book in a voice comfortable to a user.

SUMMARY OF THE INVENTION

In order to achieve the above objects, in an electronic book data delivery apparatus according to the present invention, storage means has stored a plurality of book data each representing the content of an electronic book, a plurality of reciter images each for reading aloud the content of a book represented by a respective one of the plurality of book data, and a plurality of voice data each representing a voice of a respective one of the plurality of reciter images. Receiving means receives a request for delivery of a selected one of the plurality of book data and at least one selected one of the plurality of reciter images for reading the selected book data aloud from an external electronic book device via communicating means. Sending means is responsive to the request for delivery for reading the selected book data, the at least one reciter image, and voice data representing the voice of the at least one reciter image from the storage means and for sending those data via the communication means to the external electronic book device.

In another aspect of the present invention, in an electronic book data delivery apparatus first receiving means receives at least one reciter image and corresponding voice data used to read the contents of an electronic book aloud, via a network from an external terminal. Storage means stores the at least one reciter image and corresponding voice data in corresponding relationship. Second receiving means receives a request for delivery of at least one reciter image via a network from an external electronic book device. Sending means is responsive to the second receiving means receiving the request for delivery for reading out the at least one reciter image and corresponding voice data that satisfy the request from the storage means, and for sending the read at least one reciter image and corresponding voice data to the external electronic book device.

In a further aspect of the present invention, in an electronic book device connected via a network to an external book data delivery source having stored a plurality of book titles, a plurality of reciter images and a plurality of voice data each representing a voice of a respective one of the plurality of reciter images, first receiving means receives via the network a plurality of book titles and a plurality of reciter images each used to read aloud the contents of a book having a respective one of the plurality of book titles. Specifying means specifies a desired one from among the plurality of book titles received by the first receiving means and at least one desired reciter image from among the plurality of reciter images for causing the specified at least one desired image to read aloud the contents of the book having the specified title. Second receiving means receives book data having the specified book title, the specified at least one reciter image, and the corresponding voice data from the external book data delivery source. Display means displays the book data and the at least one reciter image received by the second receiving means. Means is provided for reproducing the content of the book that is represented by the book data displayed by the display means in a voice(s) represented by the voice data corresponding to the displayed at least one reciter image.

BRIEF DESCRIPTION OF THE DRAWINGS

The above and other objects and advantages of the invention will become more apparent and will be more readily appreciated from the following detailed description of the presently preferred exemplary embodiments of the invention taken in conjunction with the accompanying drawings, in which:

FIG. 5 illustrates the composition of a book ROM of the host server;

FIG. 6 illustrates the composition of a RAM of the copyright holder terminal;

DETAILED DESCRIPTION OF THE PRESENTLY PREFERRED EMBODIMENT

An embodiment of an electronic book device and voice reproducing system according to the present invention will be described in more detail below with reference to the accompanying drawings.

Figure 1:
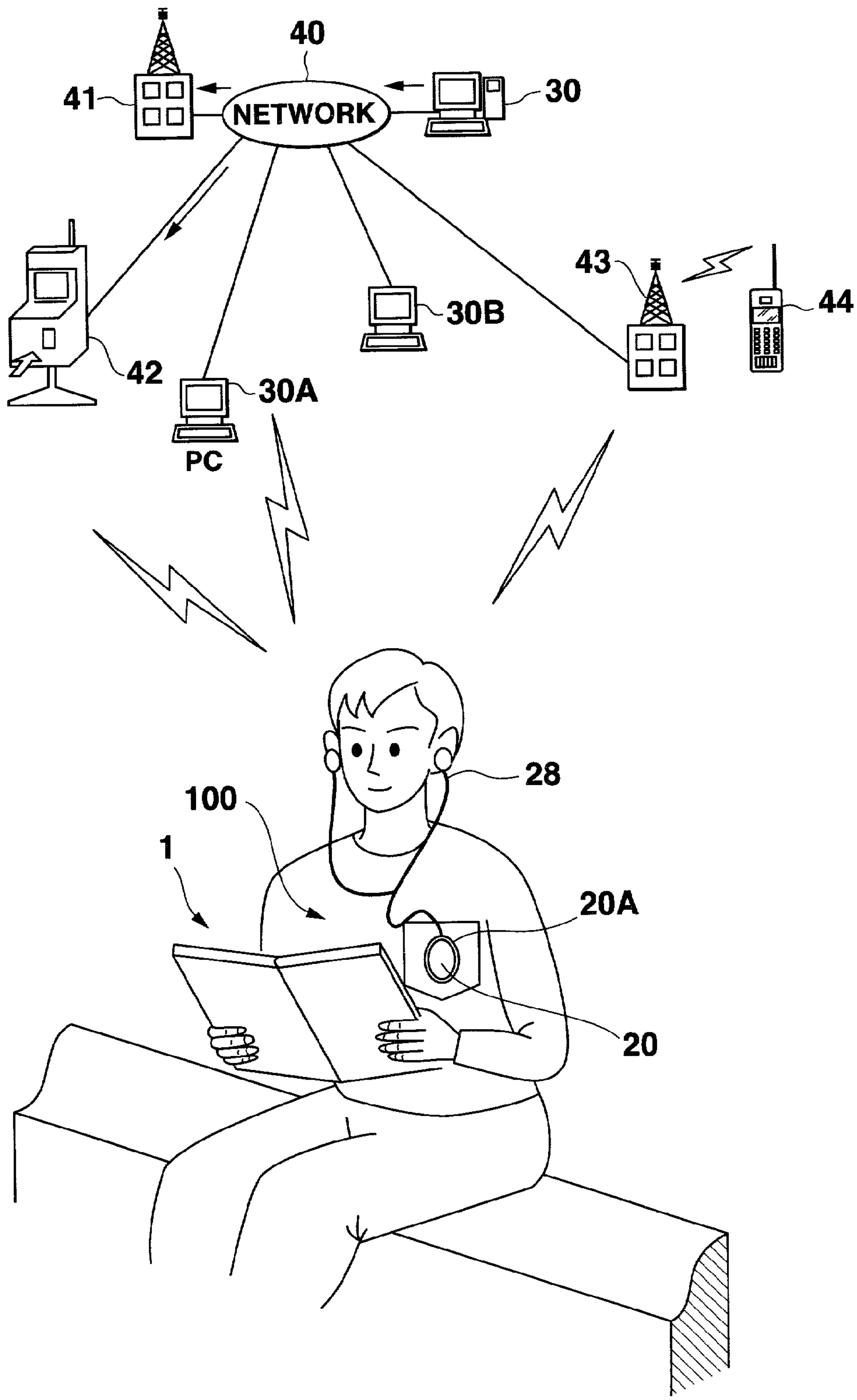
FIG. 1 schematically illustrates an inventive voice reproducing system communicating with an external device.
Figure 2:
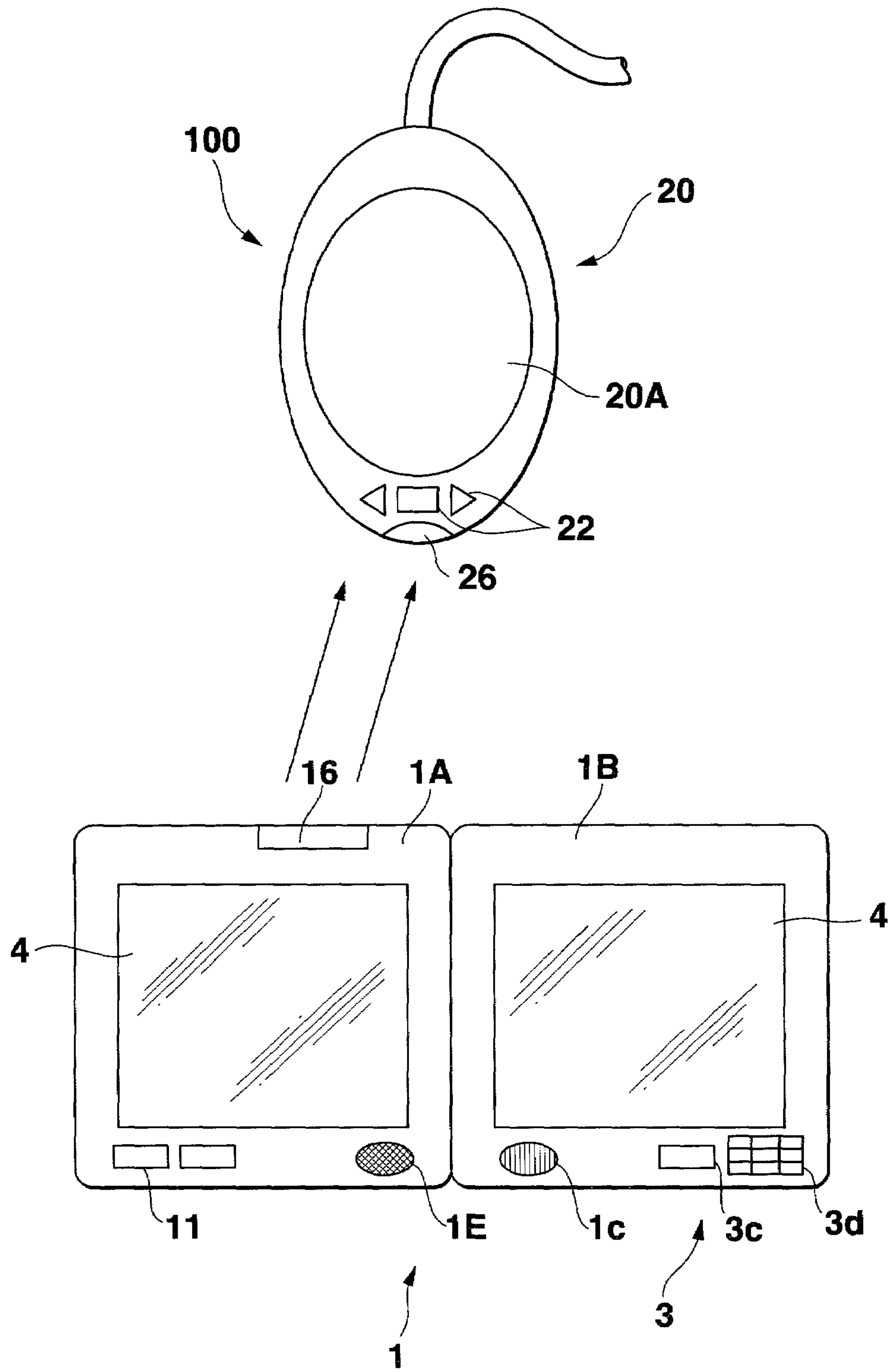
FIG. 2 schematically illustrates data communication performed between an electronic book device and a wearable device that compose the voice reproducing system.
Figure 3:
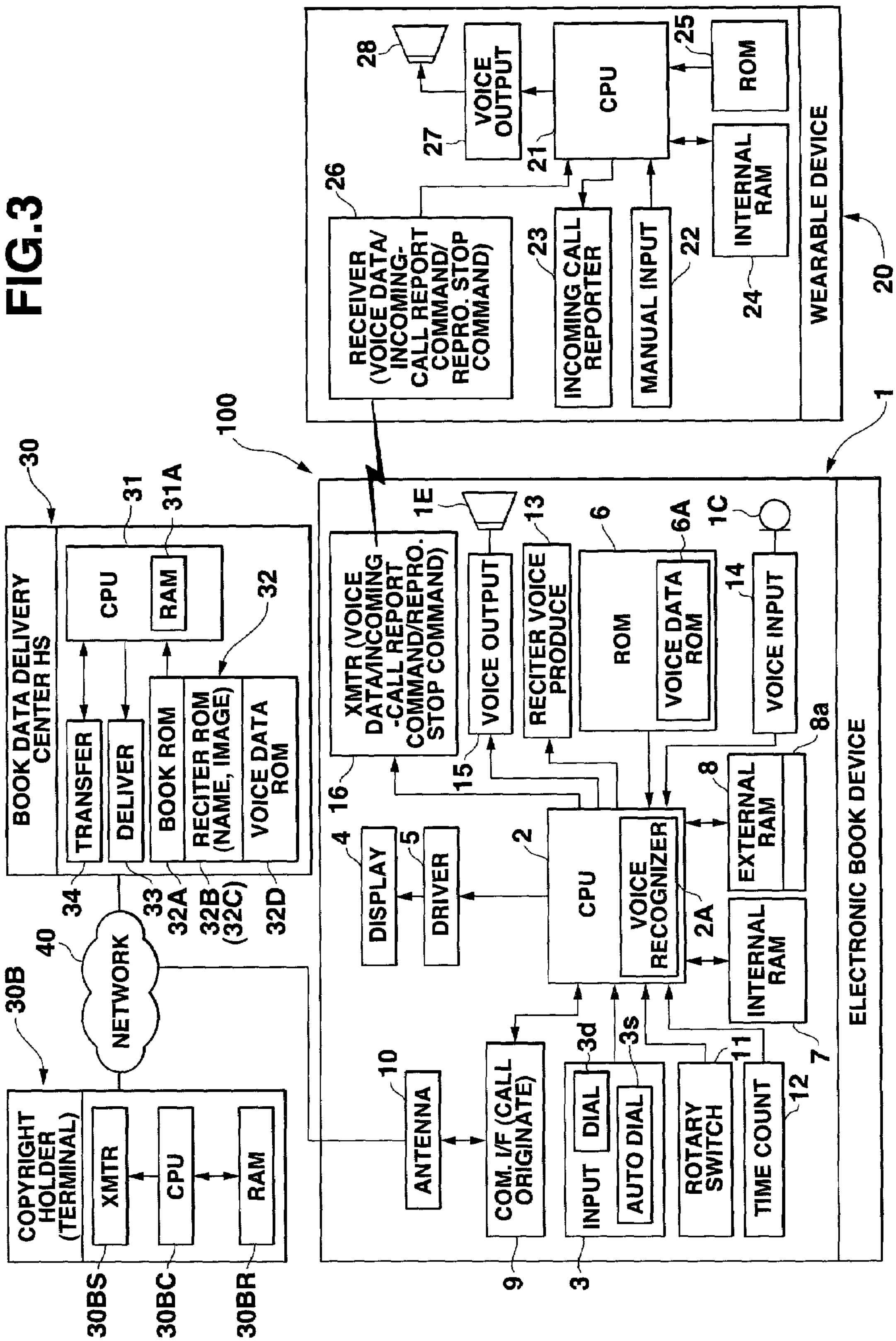
FIG. 3 is a block diagram of the electronic book device, a book data delivery center (host server), the wearable device, and a copyright holder terminal.
Figure 4:
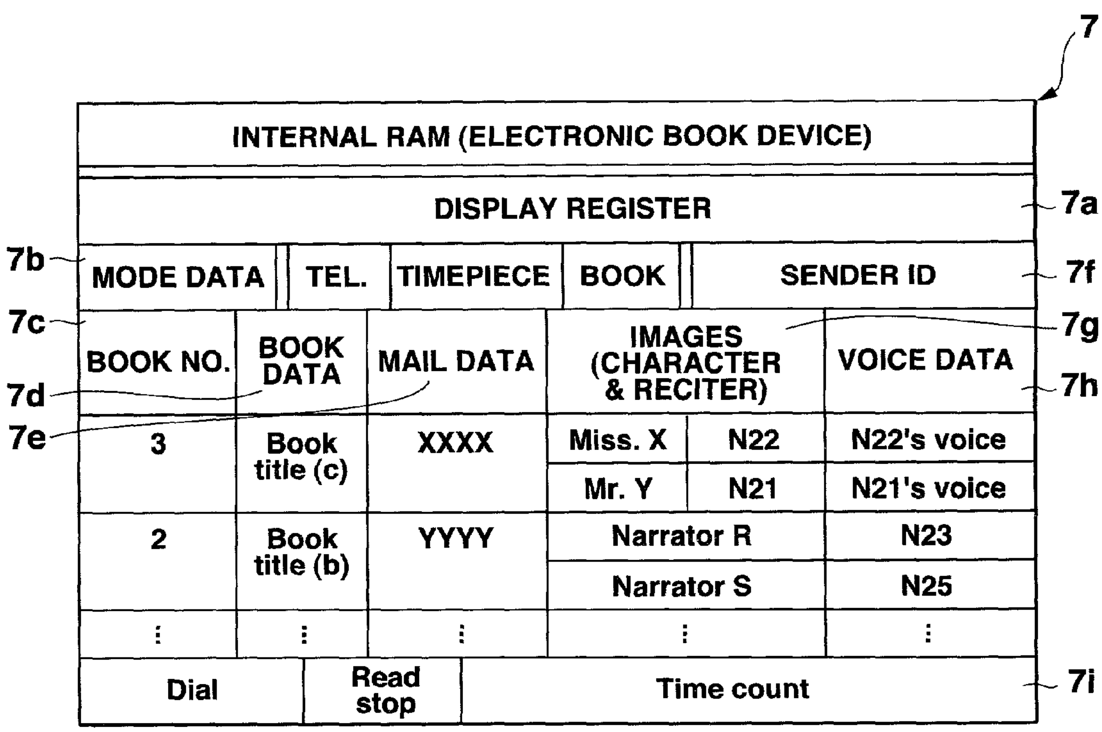
FIG. 4 illustrates the composition of an internal RAM of the electronic book device.

Compositions:

FIG. 1 schematically illustrates an inventive voice reproducing system communicating with an external device; FIG. 2 schematically illustrates data communication performed between an electronic book device and a wearable device that compose the voice reproducing system; FIG. 3 is a block diagram of the electronic book device, a book data delivery center (host server), the wearable device, and a copyright holder terminal; FIG. 4 illustrates the composition of an internal RAM of the electronic book device; FIG. 5 illustrates the composition of a book ROM of the host server; and FIG. 6 illustrates the composition of a RAM of the copyright holder terminal.

Referring to FIGS. 1 and 3, the voice reproducing system 100 includes a portable electronic book device 1 and a wearable device 20. As shown in FIGS. 1 and 2, the electronic book device 1 comprises a pair of display panels 1A and 1B hinged to each other. The display panels 1A and 1B each comprise a liquid crystal display unit 4. The book device 1 has a built-in electronic circuit of FIG. 3 behind the display panels 1A and 1B. The display panel 1A comprises a rotary switch 11, a speaker 1E, other switches including a power supply switch (not shown) and a window through which data is transmitted to the wearable device 20. The display panel 1B comprises a microphone 1C, and an input device 3 including a dial unit 3*d* and an auto dial switch 3*d*. A battery pack (not shown) is provided on the rear surface of the display panel 1B.

As shown in FIGS. 1 and 2, the wearable device 20 is made mainly of a device proper 20A and earphones 28 with the device proper 20A containing an electronic circuit of the device 20 shown in FIG. 3. A manual input unit 22, a data receive window through which data is received from the electronic book device 1, and an earphone jack not shown) into which a standard earphone plug (not shown) is insertable are provided on the device proper 20A at predetermined positions.

The wearable device 20 receives voice data (including telephone call voice data and book reading aloud voice data) wirelessly from the electronic book device 1, and outputs a voice from the earphones or a headphone (hereinafter, referred to simply as earphones 28).

The electronic book device 1 has a book data reading-aloud or reciting function that includes converting the book data into voices in which the book data is read aloud, a telephone function that includes performing telephonic and data communication with an external device, and a timepiece function that displays calendar information.

In the description below, the "book data" includes letter data, image data, data related to the book, and read-aloud voice reproducing data. The "data related to the book" includes information other than the content of the book, such as a title of the book, the author's name, and the publishing company's name concerned. The "read-aloud voice reproducing data" includes various data necessary for producing read-aloud voice data in a reading-aloud voice producer 13 of the electronic book device 1. For example, the read-aloud or reciting voice reproducing data includes data on types of books such as cartoon or comic books and novels, data on sound effects lasts, sounds of wind) to be reproduced, and a reciter voice table that has recorded voice types of famous persons, voice actors/actresses, etc., as reciters.

In a book mode, the electronic book device 1 displays on the display unit 4 letter and image data contained in the book data selected by a user at the input unit 3, converts the letter data into voice data (text voice synthesis) and audibly outputs the voice data from the speaker 1E provided on the device 1 or the earphones 28 provided on the wearable device 20. When the voice data is output from the earphones 28, read-aloud voice data (the details of which will be described later) based on the book data is sent via the transmitter 16 to the wearable device 20. The wearable device 20 audibly outputs from the earphone 28 the read-aloud voice data received by the receiver 26.

As shown in FIG. 1, in a telephone mode the electronic book device 1 connects to a mobile-terminal communication network via abase station 43 for mobile communication terminals such as mobile phones and PHSs (Personal Handyphone Systems) to have telephonic communication with another mobile communication terminal 44 or communicates with a fixed telephone via a public network line 40 to download desired book data. The electronic book device 1 is capable of accessing a host server 30 of a book data delivery site (book data delivery center HS) in the network 40 to download desired book data, and sending/receiving electronic mails to/from an external personal computer (PC).

The electronic book device 1 is further capable of connecting by cable or wirelessly to a book data delivery terminal 42, for example, installed in a book store or a convenience store to download book data stored in the book data delivery terminal 42 or in a host server 30 via the book data delivery terminal 42.

When the electronic book device 1 detects arrival of an incoming call in the book mode in which book data is being read aloud or reproduced, the book device 1 reports this fact to the user in an incoming-call sound (an alarm or a melody), a voice, a message or vibrations to stop the reading aloud of the data. When the telephone call ends, the reading aloud of the book data reopens at the position where it stopped.

In a timepiece mode, the electronic book device 1 displays calendar information such as the present date/time on the display unit 4.

Data communication to be performed between the electronic book device 1 and the wearable device 20 will be outlined with reference to FIG. 2. The electronic book device 1 sends call voice data from the transmitter 16 (FIG. 3) to the wearable device 20 in telephone communication. It also sends read-aloud voice data from the transmitter 16 (FIG. 3) to the wearable device 20 during book-data reading-aloud and reproduction. The wearable device 20 outputs from the earphones 28 the telephone-call voice data received in its receiver 26 or the read-aloud voice data. When there arrives an incoming call, the electronic book device 1 sends an incoming-call reporting command from the transmitter 16 to the wearable device 20. The wearable device 20 reports the reception of the incoming call by producing sounds or vibrations in accordance with the incoming-call reporting command received by its receiver 26. When there arrives an incoming call during the reading aloud of the book data, the electronic book device 1 sends the wearable device 20 a reproduction stop command to thereby stop reproduction of the reading-aloud voice in accordance with the received command.

Now, referring to FIG. 3 the compositions of the electronic book device 1, the host server 30 installed in the book data delivery center HS, and the wearable device 20 will be described next.

As shown in FIG. 3, the electronic book device 1 comprises a CPU 2, input unit 3, display unit 4, display driver 5, ROM 6, internal RAM 7, external RAM 8, communication I/F (InterFace) 9, antenna 10, rotary switch 11, timepiece 12, read-aloud or reciting voice producing unit 13, voice input unit 14, voice output unit 15, and transmitter 16.

The CPU 2 reads various control programs stored in the ROM 6 based on key-in signals given at the input unit 3, temporarily stores them in the internal RAM 7, and executes various processes based on the respective programs to control the respective elements of the book device 1 in a centralized manner. That is, the CPU 2 executes various processes based on the read programs, stores results of the processes in the internal RAM 7, produces display data based on the results of the processes in display driver 5, and then displays the display data on the display unit 4.

Figure 7:
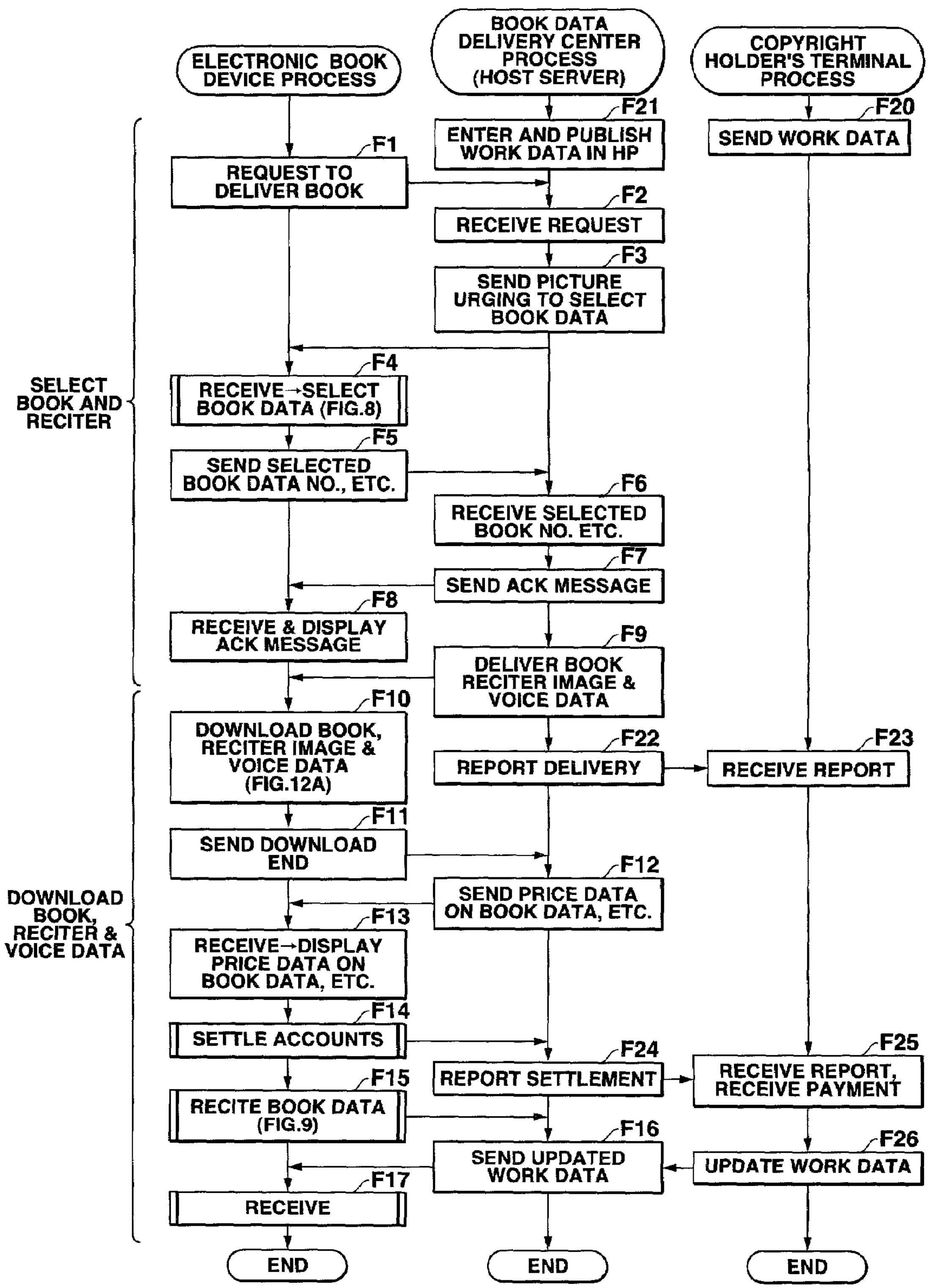
FIG. 7 is a flowchart of processes performed by the electronic book device, the book data delivery center (host server), and the copyright holder terminal.

The CPU 2 reads out from the ROM 6 a program corresponding to a telephone mode, timepiece mode or book mode in accordance with depression of a corresponding mode switch (not shown) (mode setting process) of the input unit 3, and executes a corresponding process (FIG. 4) or book data downloading process (FIG. 7).

In addition to the mode switch to be depressed when one of the telephone, timepiece and book modes is selected and the dial unit 3*d* that gives an instruction of a dialing process or another respective process, the input unit 3 includes cursor switches each to input an instruction of a respective operation, a play switch that gives an instruction of starting to read book-data aloud, a stop switch that gives an instruction of stopping to read book data aloud, and a volume adjust switch. The input unit 3 may optionally include a switch that gives an instruction of fast feed/rewinding book data, and a page feed key that gives an instruction of turning the page and feeding a frame intentionally. The dial unit 3*d* has a plurality of function keys that include an auto dial switch 3S that is operated to call a preset number automatically, and an OK key that is depressed for confirmation purposes (not shown). The auto dial switch 3S is depressed to access the host server 30 of the book data delivery center HS to thereby connect a line automatically from the communication I/F unit 9 to the host sever 30 with the aid of an automatic telephone call unit (not shown) provided in the communications I/F 9.

The display unit 4 displays data produced by the display driver 5 in accordance with an instruction from the CPU 2. For example, in the book mode the display unit 4 displays letter/image data, and data such as book title/author's name related to in the book. In the telephone mode, the display unit 4 displays the other party's telephone number. In the timepiece mode, the display unit 4 displays timepiece information such as the present time, date and day of the week. It also displays the contents of an electronic mail received externally. When there arrives an incoming call during the book mode, the display unit 4 displays a message that there has arrived an incoming call based on an incoming call report from the CPU 2.

The ROM 6 has stored a basic program and various processing programs for the electronic book device 1, and processing data in the form of a readable program code in the ROM 6. The processing programs include, for example, a mode setting process, a telephone process, a timepiece process, a book process, a book data reading-aloud/reproducing process (FIG. 9), a book data select process (FIG. 8) and a book data downloading process (FIG. 7). The CPU 2 sequentially performs processes in accordance with those program codes.

The ROM 6 includes a voice data ROM 6A that has stored a plurality of voice waveform data for use in reading aloud book data delivered externally.

The voice waveform data includes voice waveform data of analog or PCM (Pulse Code Modulation) type suitable for a voice synthesis system to be employed by the read-aloud voice producing unit 13, like the voice data stored in a voice data ROM provided in the external book data delivery center HS. For example, in a record edition system the ROM 6A has stored the waveforms of voices uttered by persons as they are or in the form of coded data. A unit of a waveform relates to a letter, a word or a phrase. In a parameter edition system, the ROM 6A has stored a plurality of groups of parameters, each group representing a respective one of the waveforms of voices uttered by persons. In a rule synthesis system, the ROM 6A has stored a plurality of groups of characteristic parameters, each group representing a respective one of small basic units such as a syllable, phoneme or waveform for one pitch extracted from a letter or phoneme symbol string based on phonetic/linguistic rules. It also has stored waveform data representing roars and cries of animals, songs of small birds, etc., and sounds produced in the natural world (such as sounds of winds, blasts, - - - sound effects) in addition to human beings' voices.

The read-aloud voice producing unit 13 includes a well-known text voice synthesis system having, for example, a rule synthesis method that converts a text (letters) of book data to voice data. This voice synthesis system includes a sentence analysis unit, a voice synthesis rule unit, and a voice synthesizer.

The sentence analysis unit includes a dictionary that has stored many words, pronunciation symbols, grammar information, and accent information. The sentence analysis unit checks a grammatical connection between words in a sentence, analyzes the structure of the sentence while checking sequentially the words of the sentence, starting at its head, for those registered in the dictionary sequentially to separate the sentence into words, and then gets information such as pronunciation symbols, grammar information and accents about the respective words.

The voice synthesis rule unit analyzes changes in pronunciation (phonemic rules) including generation of series of voiced consonants, nasalization, and aphonicness caused by pronunciation of connected words, and changes in metrical rules such as shift, loss and occurrence of accents, and determines phonetic symbols and accents to thereby determine voice synthesis control parameters. The voice synthesis control parameters include synthetic units (CVC units) such as, for example, clauses and pauses, and pitches, stresses of and intonation about voices.

When the voice synthesis control parameters are determined, the voice synthesis unit synthesizes a voice waveform based on the synthesis units and control parameters stored in the voice data ROM 6A.

The composition of the internal and external RAMS 7 and 8 will be described with reference to FIG. 4. The internal RAM 7 includes a work memory that temporarily stores a specified processing program, an input instruction, input data and a result of the processing (not shown), a display register 7*a*, a mode data storage area 7*b*, a book No. storage area 7*c*, a book data storage area 7*d*, a mail data storage area 7*e*, a sender ID storage area 7*f*, an image storage area 7*g* that has stored the images of reciters who include famous voice actors/actresses and other famous persons, and the images of characters appearing in books, a voice data storage area 7*h* that has stored voice data of the reciters and a miscellaneous storage area 7*i* that has stored dial data, a read stop register, and a timer register.

The display register 7*a* stores display data produced by the display driver 5 and to be displayed on the display unit 4. The mode data storage area 7*b* stores mode data set by a corresponding mode switch. In the electronic book device 1, the user can select any one of the telephone, timepiece and book modes. When a mode switch corresponding to any one of the three modes is depressed, the CPU 2 sets in the mode data storage area 7*b* of the internal RAM 7 a mode corresponding to the depressed switch, reads out a corresponding processing program from the ROM 6, and starts to execute the program.

The book No. storage area 7*c* stores a number allocated to a book (book No.) selected for reproducing or reading-aloud purpose. The book data storage area 7*d* stores book data corresponding to the selected book No. The mail data storage area 7*e* stores the contents (letter data, image data, etc.) of an electronic mail received externally.

The sender ID storage area 7*f* stores a sender ID of the electronic book device 1 as a sender. The sender ID includes, for example, an ID/registration code of the book device given by the host server 30 or a personal code (serial number) given to the electronic book device 1 concerned. When desired book data is to be downloaded, the communication I/F unit 9 sends the host server 30 a delivery request and the sender ID.

The miscellaneous storage area 7*i* stores registered telephone number data in a dial data storage area portion thereof, for example, a telephone number used to connect to the host server 30 in the book data delivery center HS, and telephone numbers of third parties.

The timepiece register portion of the storage area 7*i* sequentially updates and stores date and time data recorded in the timepiece unit 12.

The read stop register portion of the storage area 7*i* stores information on a position where reading the book data aloud stopped due to arrival of an incoming call.

The external RAM 8 comprises a magnetic or optical recording medium or a semiconductor memory provided fixedly or removably to the electronic book device 1. When portability of the electronic book device 1 is considered, it should preferably include a memory card composed of a small portable semiconductor memory. The external RAM 8 includes a book data storage area 8*a* that stores a plurality of book data and book Nos. received externally.

Book data stored in the external RAM 8 includes, for example, ones downloaded from the delivery center HS and written by an external device such as a PC. A user can select desired book data from the plurality of book data stored in the external RAM 8 and cause the selected book data to be reproduced in a desired voice represented by corresponding voice data stored in the ROM 6A.

The communication I/F unit 9 comprises a mobile communication unit capable of performing telephonic and data communication with an external device such as a portable telephone/PHS. The communication I/F unit 9 communicates telephonic data/electronic mails with an external device, and communicates various data to the book data delivery center HS to download desired book data. When the antenna 10 detects arrival of an incoming call, it delivers an incoming call detection signal to the CPU 2.

When a talk switch (not shown) provided on the dial unit 3*d* is operated after the arrival of an incoming call is detected by the communication I/F unit 9, the CPU 2 starts a call process. When a callee is specified by operation of the dial unit 3*d*, a call signal is sent to the callee. When the callee responds to the call signal, a communication process starts.

When the auto dial switch 3S provided on the dial unit 3*d* is operated, an automatic telephone call unit (not shown) of the communication I/F unit 9 automatically connects to the host server 30 provided on the book data delivery center HS. The communication I/F unit 9 then communicates data with the host server 30.

In the voice reproduction system 100 of FIG. 3, the data to be communicated between the book data delivery center HS and the electronic book device 1 includes, for example, the book data that the host server 30 sends out, and a request for delivery of book data to be sent to the delivery center HS. When the communication I/F 9 sends the request for delivery of book data to the host sever 30, it also sends the sender ID of the electronic book device 1 simultaneously.

The communication I/F 9 may have a connector and cable to connect the electronic book device 1 thereof to a mobile phone/PHS without directly providing the mobile communication unit including the mobile phone/PHS to the book device 1, or a communication interface such as an infrared/wireless communication unit to connect to external data communication terminals such as, for example, a book data delivery terminal and a PC comprising a modem/TA (Terminal Adapter).

The rotary switch 11 is operated manually by the user and includes a single input button having rotary and depressing functions. In the rotary operation, a picture displayed on the display screen of the book device is scrolled/the cursor position is moved in the rotary direction of the button in connection with the rotation of the button. In the depressing operation, a selected or inverted display item (cursor position) is fixed. Thus, the user can easily select and fix a registered dial number and book data.

The timepiece 12 records or counts a time and a date, and this data is delivered via the CPU 2 to the timepiece register 7*h* of the internal RAM 7 to update the old data. For example, the timepiece 12 may comprise an oscillator (not shown) that generates an electric signal having a predetermined frequency, and a divider (not shown) that divides the signal into lower frequencies to be counted to record the present time.

The voice input unit 14 converts an analog voice signal based on the user's voice picked up by the microphone 1C to a digital signal that is then delivered to the CPU 2.

The voice output unit 15 outputs a telephone call signal received via the communication I/F 9 from the other party to the speaker 1E or transmitter 16. The voice output unit 15 also outputs read-aloud voice data produced by the read-aloud voice producing unit 13 to the speaker 1E or transmitter 16.

The transmitter 16 communicates with a receiver 26 of the wearable device 20, which includes an infrared or wireless communication unit, for example. The transmitter 16 sends the wearable device 20 telephone-call voice data/read-aloud voice data produced by the read-aloud voice producing unit 13. The transmitter 16 also sends the wearable device 20 incoming-call reporting command and reproduction stop command data received from the CPU 2.

The specified composition of the wearable device 20 will be described next with reference to FIG. 3. The wearable device 20 comprises a CPU 21, a manual input unit 22, an incoming-call reporter 23, an internal RAM 24, a ROM 25, a receiver 26, a voice output unit 27, and earphones 28.

The CPU 21 controls the respective elements of the wearable device 20 in a centralized manner in accordance with various command signals (incoming-call reporting command, reproduction stop command, etc.) received by the receiver 26 thereof. In more detail, when the CPU 21 receives read-aloud voice data based on book data/telephone call voice data in the receiver 26, it transfers those voice data to the voice output unit 27 to thereby cause the earphones 28 to output the voice data audibly. When the CPU 21 receives the incoming-call reporting command in the receiver 26, it reports the arrival of the incoming-call to the incoming-call reporter 23, using a display, sounds and/or vibrations. When the CPU 21 receives the reproduction stop command, it causes the outputting of the read-aloud voice to be stopped.

The incoming-call reporter 23 comprises a ringer that rings the arrival of an incoming call, a vibrator that signals the arrival of the incoming call by vibrations, and a liquid crystal display that displays the arrival of the incoming-call signal, and/or a combination of any two or more of those elements. The incoming call reporter 23 reports the arrival of an incoming-call in accordance with the incoming-call reporting signal from the CPU 21 in the wearable device 20.

The internal RAM 24 comprises a work memory that temporarily stores various data received from the receiver and data inputted at the input unit 3. The ROM 25 comprises a semiconductor memory that has stored basic processing programs to be executed by the wearable device 20.

The receiver 26 comprises an infrared or wireless communication unit provided so as to communicate with the transmitter 16 of the electronic book device 1. The receiver 26 receives read-aloud voice data, telephone call voice data, incoming-call reporting command, and a reproduction stop command, and delivers such data to the CPU 21.

The voice output unit 27 comprises an amplifier that outputs the voice data (read-aloud voice data and telephone call voice data) received by the receiver 26 to the earphones 28 in accordance with an instruction from the CPU 21. The earphones 28 output a voice based on voice data from the voice output unit 27.

The manual input unit 22 is composed of operation keys (not shown) to control the electronic book device 1 remotely and a transmission unit (not shown) that sends a remote control signal produced by operating one of the keys to the electronic book device 1. In this respect, the electronic book device 1 also comprises a reception unit (not shown) that receives the remote control signal. Display of book data, a start and stop of reproduction of a voice reading aloud the book data in the electronic book device 1 may be controlled remotely by the manual input unit 22 of the wearable device 20.

The specified composition of the host server 30 provided in the book data delivery center HS will be described next. As shown in FIG. 3, the host server 30 comprises a book data ROM 32 that has stored a plurality of book data, a delivery unit 33 that delivers book data requested by an electronic book device 1 to this book device, a transfer unit 34 that communicates various data with the electronic book device 1 or telephone terminal 44, and a CPU 31 that controls delivery of book data stored in the book data ROM 32 to a requesting terminal.

As shown in FIG. 5, the book data ROM 32 comprises a storage area 32A that has stored letter data composing book data, images of characters appearing in the books, and sound effect data. The book data ROM 32 also comprises a name storage area 32B that has stored the names (A), (B), (C), . . . (N) of a plurality of reciters who include famous or popular persons, voice actors/actresses, etc., A, B, C, . . . N, whose images N21, N22, N23, . . . N34, are to be used to read aloud the letter data stored in the book data storage area 32A, a reciter image storage area 32C that has stored the plurality of images of the reciters and a voice data storage area 32D that has stored a plurality of voice data a, b, c, . . . and n representing the respective voices of the reciters.

In more detail, the respective reciter images stored in the image storage area 32C comprise face images (FIG. 11A) and fill-length figures of the famous voice actors/actresses and other famous persons, the images of animals, the images of virtual plants that utter their voices, and the images of famous animation or comic characters. The voice data stored in the voice data storage area 32D comprises recorded analog or digital data obtained from voices uttered by the famous actors/actresses, other famous persons, etc. The reciter images N21, N22, N23, . . . N34 of the famous actors, etc., A, B, C, . . . N stored in the storage area 32C are placed in corresponding relationship to their voice data a, b, c, . . . n stored in the storage area 32D under their respective names.

When the CPU 31 receives a request for delivery of book data from the electronic book device 1, PC or book data delivery terminal 42, the CPU 31 reads out from the book data ROM 32 information on the requested book data (book title, author's name, publishing company's name, character and reciter images, reciter voice data) and delivers those data to the requesting terminal from the delivery unit 33. Simultaneously, the CPU 31 also sends data on a charge for these data to the terminal. When the terminal admits the charge, the CPU 31 reads out the requested book data from book data ROM 32 and sends it to the electronic book device 1 or terminal.

A specified composition of each of copyright holder terminals 30B provided in the network will be described next. As shown in FIG. 3, the copyright holder terminal 30B comprises a work data RAM 30BR that has stored a plurality of work data, a transmitter 30BS that sends this data to the host server 30 provided in the delivery center HS, and a CPU 30BC that controls the respective elements of the copyright holder terminal 30B including the transmitter 30BS and work data RAM 30BR.

The work data comprises the images of the reciters who include famous persons, voice actors/actresses, famous animation characters, etc., their names and voice data representing their voices.

The copyright holder terminal 30B is owned by its copyright holder who includes an author who created the book data, famous persons whose images are used as read-aloud persons or reciter images, and a management company that manages a copyright of the reciter images and the right of its likeness.

Operation

The inventive electronic book device 1 executes processes corresponding to the respective modes set in the mode setting process. When the power supply is on, the electronic book device 1 is set in the timepiece mode in which the timepiece 12 records the present time, and also waits for a mode switch to be depressed, at which time the mode setting process starts.

The CPU 2 determines the kind of the depressed mode switch. When mode switches corresponding to the telephone, timepiece and book modes are depressed, the respective corresponding processes are executed.

The telephone, timepiece and book processes in the corresponding modes and a process for selecting and downloading desired book data will be respectively described next:

(Telephone Process)

The telephone process to be performed to make a telephone call to a person or callee (part 1) and the telephone process to be performed when the book device is called by a person (part 2) will be described next. When the electronic book device 1 makes a telephone call to a person or callee in the telephone process (part 1), the telephone mode switch is depressed.

Then, when a desired callee's telephone number is inputted at the dial unit 3*d*, or when a desired callee's number is selected from among the telephone number data stored in the dial data storage area of the internal RAM 7, or when the auto dial switch 3S is operated to dial the book data deliver center HS to thereby to turn on a dial switch (talk switch) of the dial unit 3*d*, the communication I/F 9 sends a call signal to the inputted or selected callee. When the callee or the delivery center HS responds to the call signal and the book data device 11 is connected to the callee or the delivery center HS, the telephone call process is executed.

In the telephone call process to the callee, the user's voice inputted to the microphone 1C is converted by the voice input unit 14 to a digital signal, which is then modulated and sent via the communication I/F 9 to the callee. Then a signal from the callee is received by the communication I/F 9 and delivered to the CPU 2. This signal is then converted by the voice output unit 15 to a voice signal that is then audibly output from the speaker 1E or sent from the transmitter 16 to the wearable device 20 to thereby cause the earphones 28 to output a corresponding voice in an appropriate volume. The CPU 2 may display on the display unit 4 telephone call data such as the callee's telephone number, name and an elapsed communication time during the telephone call.

When there arrives an incoming call from an external caller during the use of the electronic book device 1 in the timepiece or book mode, the telephone process (part 2) starts. When the communication I/F 9 detects the arrival of the incoming call and delivers a corresponding detection signal to the CPU 2, the CPU 2 determines whether the book data is under reproduction at present. If it is, the CPU 2 delivers to the transmission unit 16 a reproduction stop command to stop reproduction of the book data. At this time, the CPU 2 stores data on a position on the book page, where the reading aloud of the book data stopped, in the incoming call register 7*i* of the internal RAM 7. The CPU 2 also delivers to the transmission unit 16 data to report the arrival of the incoming call. The transmission unit 16 then sends the wearable device 20 the reproduction stop command and the incoming call report command. The wearable device 20 stops reading-aloud or reproduction of the voice output unit 27 and reports the arrival of the incoming call with the aid of the incoming call reporter 23, based on the received reproduction stop command and incoming call report command, respectively. The arrival of the incoming call is reported, for example, by a predetermined sound or message voice (stored in ROM 25) or in vibrations given by the vibrator. The electronic book device 1 may display a message reporting the arrival of the incoming call on the display unit 4.

Then, when the incoming call is responded by depressing the talk switch, the telephone call process starts. When the telephone call ends, the CPU 2 reads out the data on the position o the book page where the reading-aloud of the book data stopped from the read stop register 7*i* of the internal RAM 7 to reopen the read-aloud or reproduction of the book data at that position to thereby restore the normal book mode and to terminate the telephone process (part 2).

When no book data is being read aloud or reproduced at the arrival of the incoming call, the arrival of the incoming call is reported. When the incoming call is responded by depressing the talk switch, the telephone call process is performed. When the telephone call is terminated, the timepiece mode is restored to thereby terminate the telephone call process (2).

(Timepiece Process)

The timepiece process to be performed in the set timepiece mode will be described next. When calendar information such as the present date/time is displayed on the display unit 4, using the electronic book device 1, the timepiece mode is set by operating the corresponding mode switch. In more detail, the CPU 2 sets the timepiece mode in the mode data storage area 7*b* of the internal RAM 7, refers to the present time counted by a time counter 12, updates data in the time count register 7*h* of the internal RAM 7, and outputs the present time data to the display driver 5. The display driver 5 produces the present date/time data, stores same in the display register 7*a* of the internal RAM 7 and displays it on the display unit 4.

As described above, by simple depression of the mode switch the timepiece mode is selected instantaneously to thereby display the present date/time on the display unit 4.

(Book Process)

Figure 8:
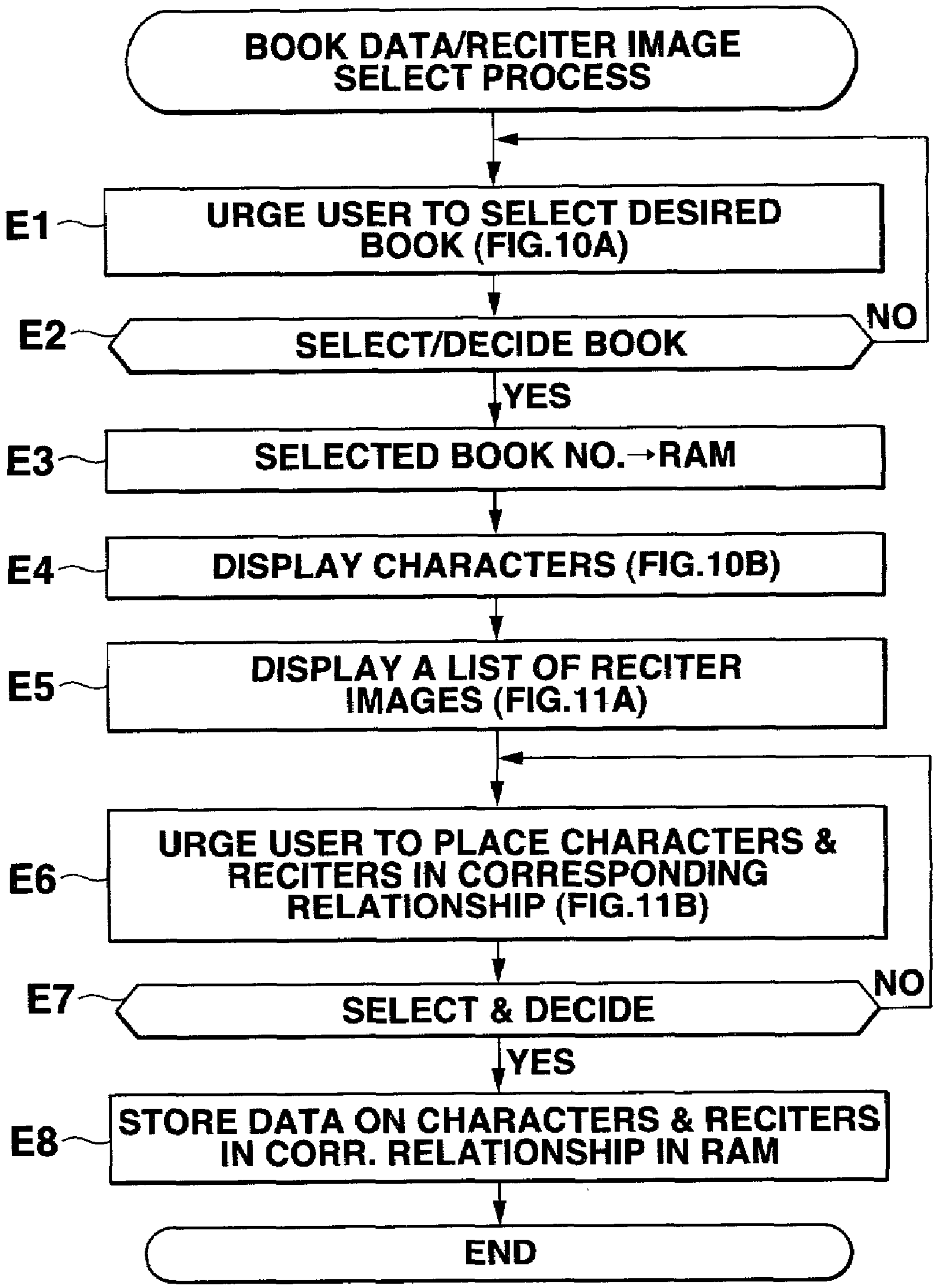
FIG. 8 is a flowchart of a book data/reciter image select process.
Figure 9:
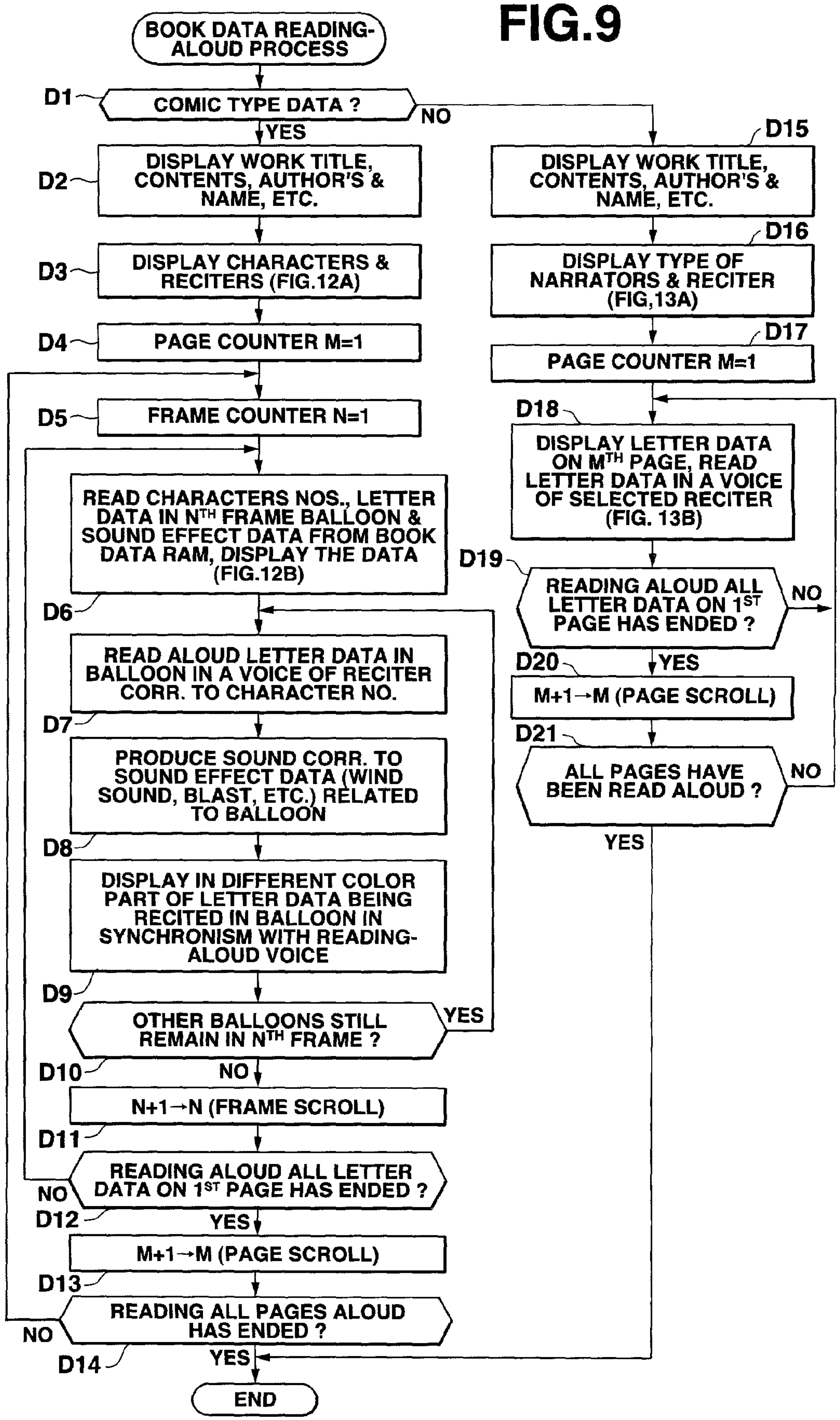
FIG. 9 is a flowchart of a book data reading-aloud process.

Referring to FIG. 7, the processes to be performed by the electric book device will be described next. FIG. 7 is an overall flowchart illustrating the respective processes performed by the electronic book device, book data delivery center and copyright holder terminal. FIG. 8 is a flowchart illustrating a process for selecting book data and a reciter image. FIG. 9 is a flowchart illustrating a process for reading aloud or reproducing book data.

Reading aloud or reproducing the book data stored in the electronic book device 1 using voice data stored in the voice data ROM 6A of the electronic book device 1 will be described.

When desired book data selected from among the plurality of book data stored in the external RAM 8 is to be read aloud or reproduced in the electronic book device 1, the book mode switch is depressed.

Figure 10A:
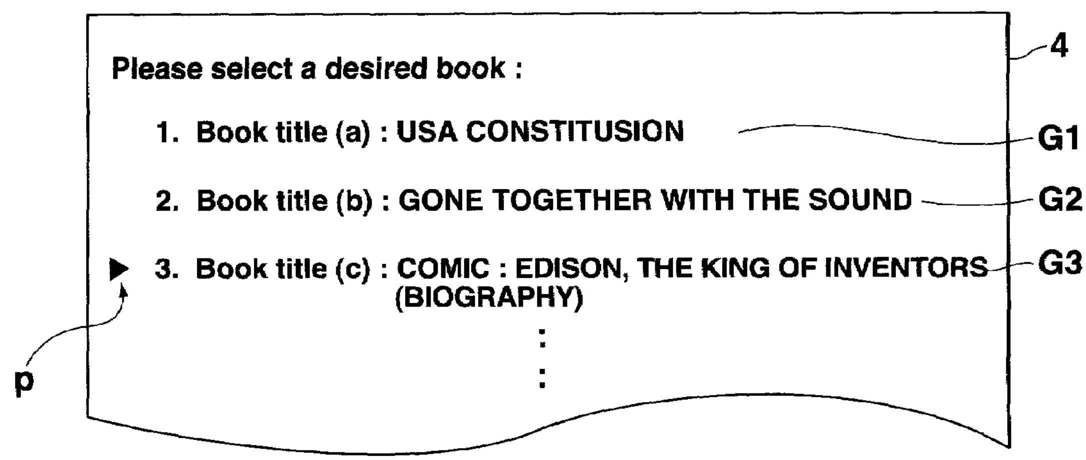
FIGS. 10A and 10B illustrate a picture in which a book to be read aloud is to be selected, and a picture in which the book to be read aloud has been selected, respectively.

In response, the CPU 2 reads out all the data related to the books stored in the external RAM 8 and displays the read data on the display unit 4. For example, as shown in FIG. 10A, the CPU 2 indicates a message M2 "Please select a desired book", all book Nos. and titles such as "1. Book title (a)", "2. Book title (b)", . . . and a pointer P to select the desired book.

When a book to be reproduced or its title is selected by operating the cursor switch of the input unit 3 or the rotary switch 11, and the depress switch is then depressed, the CPU 2 reads out book data corresponding to the selected book title from the external RAM 8 and stores the data in the book data storage area 7*d* of the internal RAM 7.

The CPU 2 transfers text data on a first page (cover page) of the read-out book data to the display driver 5, which produces corresponding data to thereby be displayed on the display unit 4. The CPU 2 then gives the read-aloud voice producing unit 13 a read-aloud start command, using voice data stored in the voice data ROM 6A, and performs a process for reading aloud or reproducing the book data in a voice represented by stored relevant voice data.

Referring to FIG. 7, a process to be performed by the book data delivery center HS for the user to download desired book data from the book data delivery center HS onto the user's electronic book device 1 will be described next along with data communication performed between the user's electronic book device 1 and the book data delivery center HS.

First, the user of the electronic book device 1 accesses a homepage of the book data delivery center HS, for example, via the Internet 40 and sends a request for delivery of a desired book and the user ID to the delivery center HS (step F1). The CPU 31 of the host server 30 receives these data (step F2), and stores these data in the RAM 31A In order to display on the electronic book device 1 a book select picture that urges the user to select a desired book, the CPU 31 of the host server 30 sends back the book select picture data (including data related to the book data) to the requesting terminal or the electronic book device 1 (step F3).

When the electronic book device 1 receives the book select picture data, it displays on the display unit 4 a book select picture corresponding to the received book select picture data, and then the user selects book data on the book select picture (step F4 in FIG. 7A) to download desired book data from the book data delivery center HS.

FIG. 8 is a flowchart of the book data select process to be performed by the electronic book device 1. FIG. 10A illustrates a book select picture to select book data to be downloaded.

In order to download the book data, the book select process of FIG. 8 is performed. When the auto dial switch 3*s* is depressed in the electronic book device 1, the automatic telephone call unit provided in the communication I/F 9 connects a line automatically from the electronic book device 1 to the book data delivery center HS. The communication I/F 9 sends the book data delivery center HS a request for delivery of desired book data and the sender ID of the electronic book device 1 thereof. When the book data delivery center HS receives these data, it sends back data related to deliverable book data (book titles, author names, publishing company's names, etc.) to the electronic book device 1.

When the electronic book device 1 receives the book-related data via the communication I/F 9 from the book data delivery center HS, the CPU 2 displays on the display unit 4 a book select picture that contains the book-related data, as shown in FIG. 10A.

The book select picture displayed on the display unit 4 contains a message M2 to urge the user to select book data to be downloaded: "Please select a desired book", and all data G1, G2, G3 . . . related to deliverable book data. For example, data G1 related to book No. 1 contains book title (a): "USA CONSTITUTION"; data G2 related to book No. 2 contains book title (b): "GONE TOGETHER WITH THE SOUND"; and data G3 related to book No. 3 contains book title (c): "COMIC: EDISON, THE KING OF INVENTORS: (BIOGRAPHY)".

The displayed pointer P can be moved to a position of a desired book title by operating the cursor switch or the rotary switch 11 and a decision switch(not shown) can be operated to select the desired book from the related data.

When the desired book is determined (YES in step E2), the CPU 2 stores the book No. of the selected book in the internal RAM 7 (step E3). Simultaneously, the CPU 2 sends a request for delivery of the selected book, the selected book No. and the sender or user ID via the communication I/F 9 to the book data delivery center HS.

When the book data delivery center HS receives these data, it reads out from the book data ROM 32 book data (containing a plurality of character images appearing in the book data) corresponding to the selected book No., and the images of the famous persons, etc., as reciters, and sends these data to the electronic book device 1 that sent the sender ID via the Internet 40 to the delivery center.

Figure 10B:
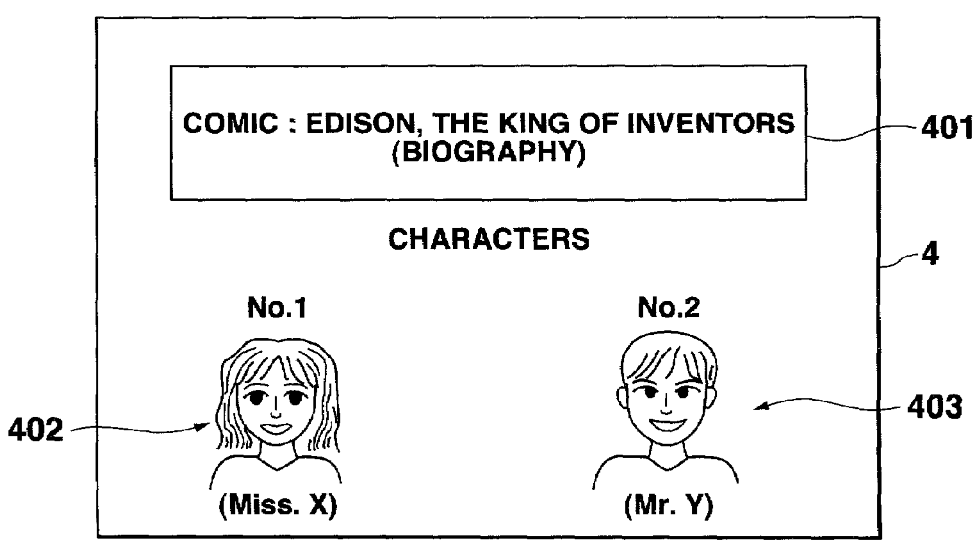
Figure 11A:
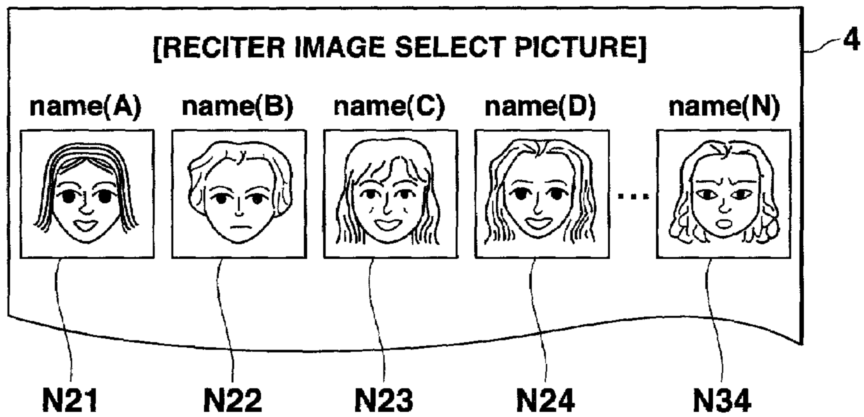
FIGS. 11A and 11B illustrate a picture in which reciter images that read a book aloud are to be selected and a picture in which characters appearing in the book and reciter images who are to be selected and allocated to the character images are displayed, respectively.

When the electronic book device 1 receives these data, it stores the data in the internal RAM 7*a*. Then, the electronic book device 1 displays on the display unit 4 the images of the characters 402 and 403 of the received book data, as shown in FIG. 10B (step E4). Then, when a predetermined time elapses, images of reciters N21–N25 are displayed together as shown in FIG. 11A (step E5).

Figure 11B:
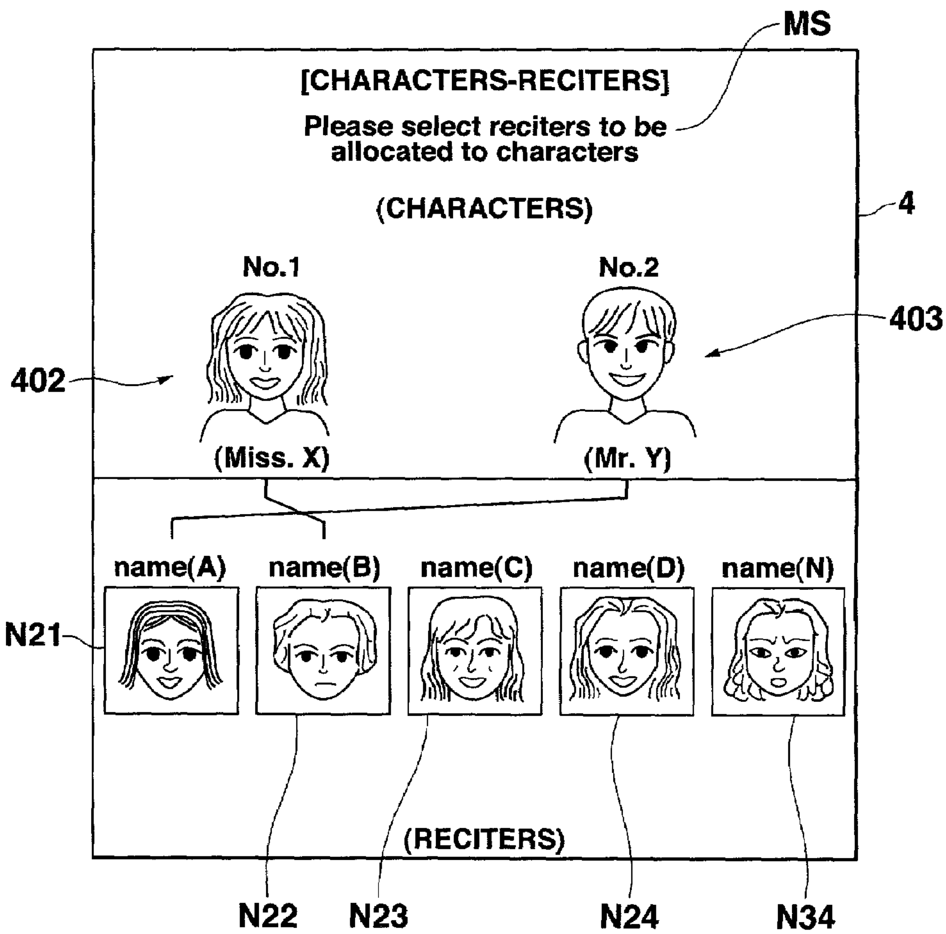

Then, when a further predetermined time elapses, the electronic book device 1 urges the user to select and allocate desired two of the reciter images N21–N25 to the character images 402 and 403, respectively, as shown in FIG. 11B step E6).

Thus, the user selects and decides the desired reciter images (step E7). Then, the book device 1 stores those decided reciter images in the corresponding area 7*g* of the RAM 7 (step E8). For example, when the user selects a reciter image N22 of the famous persons B from among the reciter images N21–N25 of the famous persons A . . . N of FIG. 11A and allocates this reciter image to the character image 402 of "Miss X" appearing in the book data, as shown in FIG. 11B, the character image 402 for "Miss X" and the reciter image N22 are stored in corresponding relationship in the area 7*g* of the RAM 7. Likewise, when a reciter image N21 of the famous person A is allocated to a character image 403 of "Mr. Y" appearing in the book, the character image 403 for "Mr. Y" and the reciter image N21 are stored in corresponding relationship in the area 7*g* of RAM 7. Then, the book data and reciter image selecting process is terminated.

Referring back to FIG. 7, a process for downloading the book data is performed. To this end, the auto dial switch 3S of the electronic book device 1 is depressed. In response, the automatic telephone call unit of the communication I/F 9 automatically connects a line from the communication I/F 9 to the book data delivery center HS. The communication I/F 9 then sends a request for delivery of book data and the sender ID of the electric book device 1 thereof to the book data delivery center HS.

When the book data delivery center HS receives these data, it sends the book device 1 an acknowledgement of those data and data related to deliverable book data such as book titles.

When the electronic book device 1 receives these data via the communication I/F 9, the CPU 2 of the book device 1 displays these data on the display unit 4. The book device 1 then sends the book delivery center HS the book No. selected on the book select picture, along with the sender ID of the book device 1 (step F5).

When the host server 30 receives those data from the electronic book device 1 (step F6), it stores the data in the RAM 31A, reads out a message about the acknowledgement of the book No. selected from a message ROM not shown) of the host server 30, and then sends the message back to the electronic book device 1 (step F7).

The electronic book device 1 displays this message on the display unit 4 (step F8).

The host server 30 then sends the electronic book device 1 book data for the book No., reciter images, and their voice data selected in the electronic book device 1 (step F9).

The electronic book device 1 downloads the book data, reciter images, and their voice data into the book data storage area 7*d*, reciter image storage area 7*g* and voice data storage area 7*h*, respectively, of the RAM 7 thereof for each book No. (step F10). When this downloading process ends, the electronic book device 1 sends the host server 30 data indicative of completion of the data downloading (step F11).

Then, the host sever 30 sends the electronic book device 1 data on bill data about the sum of the price of the book data, reciter images, etc., and a delivery charge cost to download the book data, etc. (step F12). The electronic book device 1 displays this bill data on the display unit 4 (step F13). The electronic book device 1 performs a process for settling accounts with the host sever 30 for the bill data. There are various accounts settling methods. For example, the electronic book device 1 can request a financial institution to pay the host server 30 for the bill (step F14).

The host server 30 sends the electronic book device 1 the bill data and informs the copyright holder terminal 30B of the sale of the electronic book via the Internet 44 (step F22). The copyright holder terminal 30B receives this information from the host server 30 (step F23). The "copyright holder" referred to here includes an author who created the book data, the famous persons, voice actors/voice actresses, whose images were used as the reciter images, and a managing company that manages the copyright of the reciter images and the right of their likeness.

Then, a process for reading aloud and reproducing the book data is performed as shown in FIG. 9 (step F14), which will be described next.

Figure 12A:
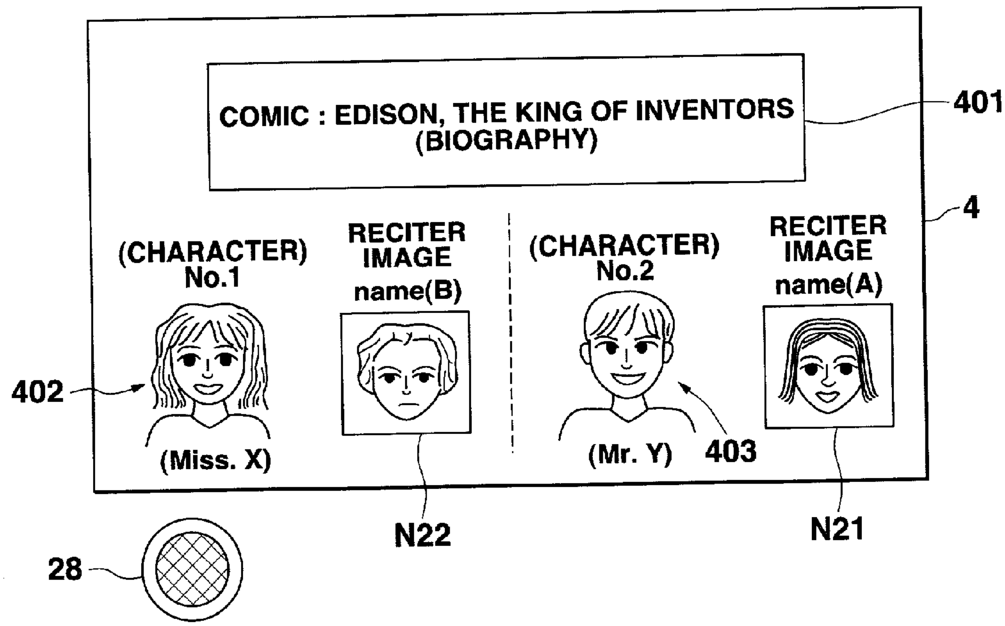
FIGS. 12A and 12B illustrate a picture in which reciter images are selected and allocated to the character images, respectively, and a picture appearing during recitation of the book, respectively.

The CPU 2 of the electronic book device 1 determines whether or not the delivered book data stored in the book data storage area 7*d* of the internal RAM 7 is of the cartoon or comic type in the book data reciting or reproducing process. If it is (YES in step D1), the CPU 2 reads out the title, author's name and contents data from the book data storage area 7*d* and displays those data on the display unit 4 (step D2). Then, as shown in FIG. 12A the CPU 2 extracts from the RAM 7 the images 402 and 403 of the characters appearing in the book, their names (Miss X, Mr. Y) included in the book data and the corresponding reciter images N21 and N22, and displays these images on the display unit 4 (step D3).

FIG. 12A illustrates a start of reproduction of comic book data. As shown, a title of a book 401 is displayed as "COMIC: EDISON, THE KING OF INVENTORS (BIOGRAPHY)" along with an image 402 of "Miss X", character No. 1. Likewise, an image 403 of Mr. Y, character No. 2, is displayed. Reciter images N21 and N22 stored in the RAM character storage area 7*g* and selected by the user are displayed.

The CPU 2 then sets a page counter M to an initial value "1" (step D4), sets a frame counter N to an initial value "1" (step D5), reads out from the book data storage area 7*d* book data including character No., balloon, illustration, background image, letter and sound effect data contained in a first frame on a first page, and displays a character ("Mr. Y") 403, a balloon 409, an illustration, a background image 406, and letters 408 contained in the balloon 409 (step D6) based on those data, as shown in the first or right frame of FIG. 12B.

Figure 12B:
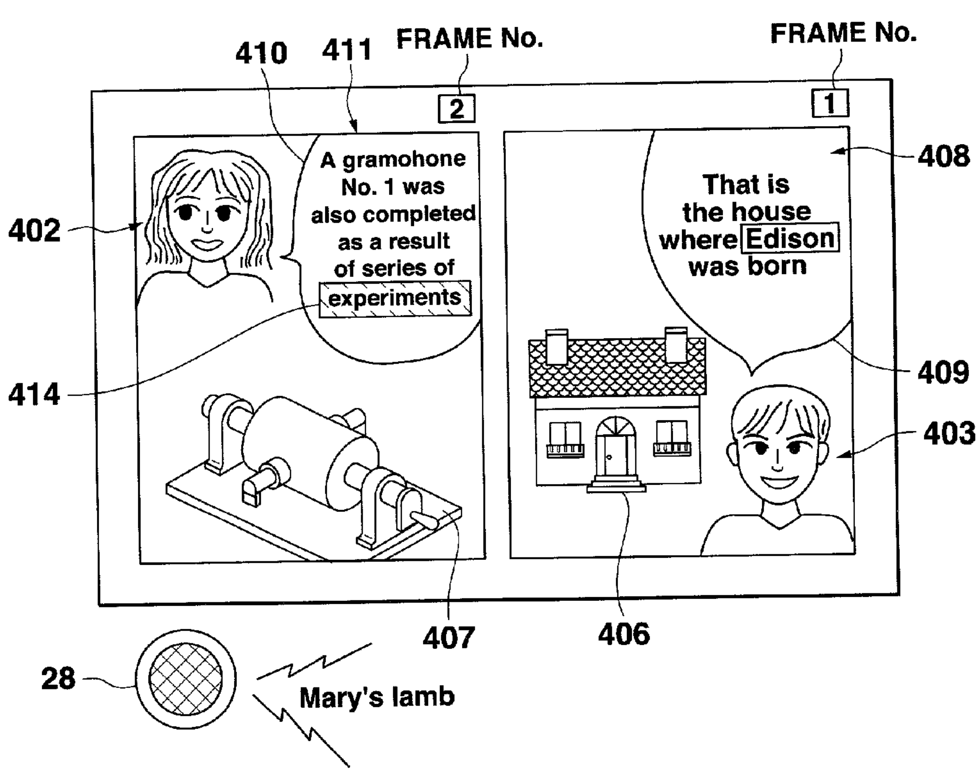

The read-aloud voice producing unit 13, the voice output unit 15 and the speaker 1E cooperate to read out the book or letter data in the balloon 409 in the voice of the reciter N21 allocated to the character Mr. Y based on the reciter's voice data stored in the RAM voice data storage area 7*h* (step D7). For example, FIG. 12B illustrates that a recitation "This is the house where Edison was born." represented by the letters 408 in the first balloon 409 is being reproduced from the earphones 28 in the voice of the reciter image N21 allocated to "Mr. Y" or character image 403.

The CPU 2 displays the color of letters being at present read aloud in the balloon 409 in the reading-aloud voice in a different color from that of the remaining letters (step D9). For example, FIG. 12B illustrates in its first or left frame that a word "Edison" 416 contained in the letters 408 in the balloon 409 is being at present reproduced audibly from the earphones 28 and also displayed in a color different from that of the remaining letters in the balloon 409.

After the voice reproduction for the balloon 409 is completed, the CPU 2 further determines whether there remain any more balloons in an $N^{th}$ frame (here, first frame) (step D10). If there do (YES in step D10), the control returns to step D7 to iterate steps D7–D9.

The read-aloud voice producing unit 13 delivers the reciter voice signal along with the sound effect signal via the voice output unit 15 to the transmitter 16, which then sends the voice signal wirelessly to the wearable device 20 through the windows concerned. The wearable device 20 receives the voice signal in its receiver 26 and outputs it from the earphones 28 audibly (step D8).

Therefore, the user can hear words or sentences in the book "COMIC: EDISON, THE KING OF INVENTORS (BIOGRAPHY)" being read aloud or recited in the voice of the reciter who was the selected favorite famous person, inclusive of the sound effects.

Then, when there remain no more balloons in the $N^{th}$ frame (here, first frame) (NO in step D10), the CPU 2 increments the frame counter (N+1→N in step D11).

The CPU 2 then determines whether all the letter data contained in the page has been read aloud step D12). If it has not, (NO in step D12), the CPU 2 iterates processes in steps D6–D11 about the $(N+1)^{th}$ frame. That is, the CPU 2 displays the $(N+1)^{th}$ or left frame (in FIG. 12B) at the center of the display picture by scrolling, and controls the voice reproducing unit so that the text (letters) contained in a balloon 410 contained in the displayed frame is read aloud, that sound effect data is reproduced, and that the portion of the text being read aloud at present in the balloon is displayed in a color different from the remaining text (letter) data.

The left or second frame displays "Miss X" or character image 402, an illustration or a background image 407, letters 411 and a balloon 410 that contains the letters. The letters 411 in the balloon 410 represent the words that "Mr. A" utters.

Like the first frame, the second frame indicates that a recitation "A gramophone No. 1 was also completed as a result of a series of experiments." is being reproduced from the earphones 28 in the voice of the reciter image N22 allocated to the image 403 of the character "Miss X", based on the processing in step D7. In step D8 the second frame indicates that voice data "Mary's lamb" or sound effect data output from the gramophone is being output from the earphones 28 in the voice of the reciter image N22 in step D8.

FIG. 12B shows a two-frame cartoon. The number of frames of the cartoon is not limited to two and may be either one or more than two so that the number of frames displayed on a single page may be changed depending on the size of frames used, as requested.

When all the texts (letter) data contained in the frames of the displayed page have been read aloud (YES in step D12), the CPU 2 increments the page counter M (M+1→M in step D13). If all the pages have not been read aloud (NO in step D14), the CPU 2 displays a next page by scrolling and sequentially causes text (letter) data in the displayed frames to be read aloud, starting with the first frame.

The CPU 2 produces and displays on the display unit 4 data on a $M^{th}$ page based on the book data stored in the book data storage area 7*d* of the internal RAM 7. The CPU 2 iterates steps D5–D13 to reproduce text (letters) data contained in the respective N frames contained in the $M^{th}$ page in a voice corresponding to a reciter and a sound effect corresponding to effect sound data, and displays the letters in the balloon being read aloud in a color different from that of the remaining letters. In synchronism with the advance of these voices, the CPU 2 scrolls and displays the frames.

Then, when the CPU 2 determines that all the pages have been read aloud or reproduced (YES in step D14), it terminates the reading-aloud or reproducing process. When the book data is not of the cartoon or comic type in step D1, but for example, of the novel or story type, the CPU 2 performs the following processes (steps D15–D21).

First, the CPU 2 reads out data on a title of a book, the author's name and a table of contents from the book data storage area 7*d*, and displays those data on the display unit 4 (step D15). The CPU 2 then extracts a narrator image or name from the book data, and displays it step D16 in FIG. 13A).

Figure 13A:
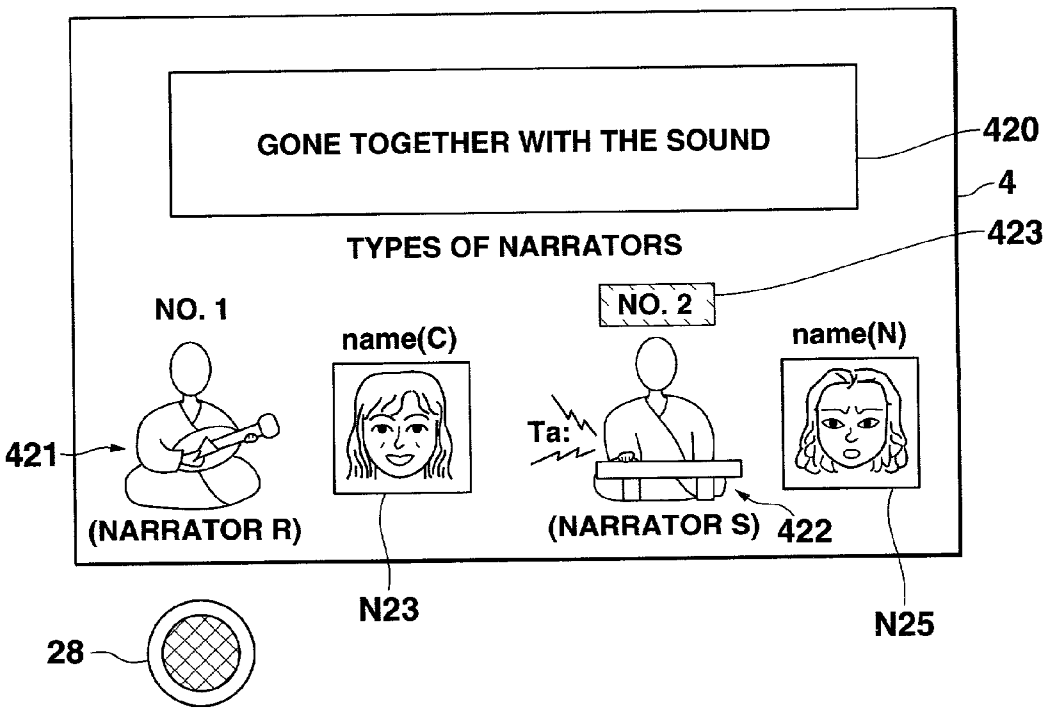
FIGS. 13A and 13B illustrate a picture in which reciter images are allocated to narrator images, respectively, who narrate a book, and a picture appearing during recitation of the book, respectively.

In more detail, FIG. 13A illustrates a picture in which a reciter image is to be selected when reproduction of a book of a story type starts. In FIG. 13A, a title of a book "GONE TOGETHER WITH THE SOUND" 420 is displayed as an example. Also, an image 421 of narrator R and an image 422 of narrator S are displayed along together with a reciter images N23 of famous person C and reciter image N25 of famous person D allocated to the respective narrator images 421 and 422 by the user.

One of the narrator images is selected with the cursor 23 of the input unit 3, at which time the selected narrator image, and the reciter image and voice data allocated to the narrator image are set in the internal RAM 7, an initial value of the page counter n is set to initial value "1" (step D17), and the book data on page "1" is displayed on the display unit 4.

The CPU 2 causes the narrator image to read aloud letter data 425 contained in the book data on the page "1" in the voice of the famous person represented by the reciter image allocated to the narrator image step D18).

Figure 13B:
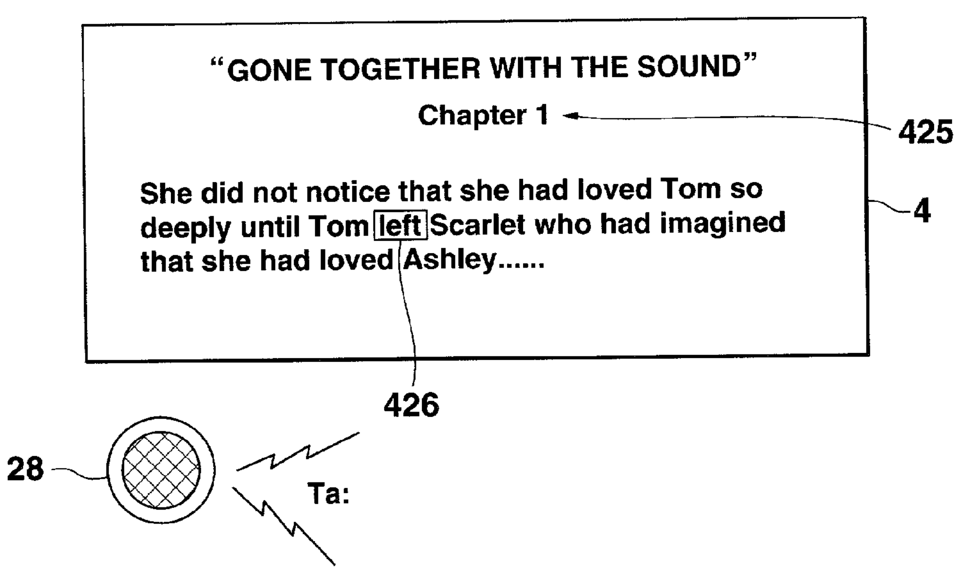

For example, when the narrator image S is selected in FIG. 13A, the CPU 2 gets voice data on the reciter image N25 allocated to the narrator image S and sets the data in the internal RAM 7. Then, as shown in FIG. 13B the CPU 2 displays on the display unit 4 text (letter) data 425 on a first page of the book, transfers this data to reading-aloud voice producing unit 13.

The voice producing unit 13 reads aloud the letter data as if the narrator image S narrates the content of the book concerned in a voice represented by the voice data of the famous person represented by the reciter image N25.

At this time, the CPU 2 displays the color of the part of the text (letters) 426 being read aloud in synchronism with the reading-aloud voice of the narrator image S (actually, the voice of the reciter image N25) in a color different from that of the remaining text portion. For example, when a reciting sound "left" is being output audibly from the earphones 28, the word "left" 426 of the text is displayed on the display unit 4 in a color different from that of the other words.

Sound effect data not included in the letter data may be inserted into the letter data as requested. For example, as shown in FIG. 13B a unique sound "Ta:" produced when the "narrator image S" beats his desk with a folded fan to rearrange his tone may be output audibly from the earphones 28 during the reproduction. Alternatively, sound effect data may be included in the book data so as to be produced at a predetermined timing such that the text may be narrated along with effect sounds such as the sounds of a temple bell/the singing of insects.

Then, when reading aloud all the text (letter) data on the $M^{th}$ page is completed (YES in step D19) the CPU 2 increments the page counter M (M+1→M in step D20) and determines whether all the pages have been read aloud (step D21). If they have not, the CPU 2 displays a next page by scrolling and then returns the control to step D20 to read aloud letter data on the displayed $M^{th}$ page. Then, when all the pages have been read aloud (YES in step D21), the CPU 2 stops reproduction to thereby terminate this process.

When the stop switch is turned on during reproduction of the book data, reproduction of the book data is stopped and terminated.

As described above, according to the inventive electronic book device 1 the displayed frames and pages are scrolled in synchronism with the advance of the reading-aloud voice, so that the user need not turn the page/feed frames intentionally. Thus, the user can enjoy reading comfortably at the electronic book device 1.

The copyright holder terminal 30B is connected via the network 40 to the host server 30. The copyright holder terminal 30B stores in its work data RAM 30 BR work data that includes the images of reciters who, in turn, include famous persons, voice actors/actresses, etc., their names and voice data. Then, the copyright holder terminal 30B sends the work data via the network 40 to the host server 30 (step F20). Then, the host server 30 receives this work data and registers same in the RAM 31A. Each time the host server 30 receives work data from the copyright holder terminal 30B, the host server 30 publishes the data in the homepage thereof (step F21).

The work data published in the homepage (HP) of the host server 30 can be utilized at a request from the electronic book device 1 (step F1). A result of utilizing the work data is reported to the copyright holder terminal 30B from the host server 30 (step F22). The copyright holder terminal 30B receives the report from the host server 30 (step F23). As the electronic book device 1 downloads electronic book data, the host server 30 reports to the copyright holder terminal 30B a result of settling a bill for the total of the price of the book data and a charge for the delivery of the book data (step F24). After receiving the report the copyright holder terminal 30B can receive a corresponding copyright fee (step F25).

If the copyright holder terminal 30B then newly stores in its work data RAM 30BR work data that includes reciter images of famous actors/actresses, entertainers, Nobel prize winners and famous sportsmen and sportswomen, their names, and voice data representing their voices, the copyright holder terminal 30B sends the work data as updated one to the host server 30 via the network 40 (step F26). The host server 30 receives and stores this data in the RAM 31A and sends this data at a request of the book device(step F16).

As described above, each time the host server 30 receives the updated work data from the copyright holder terminal 30B, the host server 30 publishes the data in the homepage thereof(step F21). Thus, the electronic book device 1 can store the images and voice data of the reciters as the updated work data in the internal and external RAMS 7 and 8 thereof. Therefore, the electronic book device 1 can rapidly and easily utilize the data as new reciter images and their voice data to be allocated to characters appearing in the book data delivered by the host server 30 (steps F1–F17).

As described above, in the book process desired book data and voice data can be read out from the external RAM 8 to thereby be read aloud in a voice represented by the voice data. A plurality of book data and voice data downloaded externally is stored in the internal RAM 7.

If there arrives a telephone call during reading aloud of the book data, the CPU 2 outputs a command to report the arrival of the telephone call and a command to stop reading aloud the book data to thereby cause the corresponding process to be performed. The CPU 2 stores in the read stop register 7*i* a position on the page where the reading-aloud of the book data has stopped. When the telephone call ends, the CPU 2 reopens reading-aloud the book data at the stored position where the reading-aloud of the book data stopped.

The CPU 2 then determines the type of book data and changes the unit of display. For example, if the book data is of the cartoon or conic type, it can be displayed in frames, for example, in units of two frames in each of which the reciter image allocated to the character in the book reads aloud the text (letter data) in his or her voice. The CPU 2 can also change the manner of setting the kind of reading-aloud voice depending on the determined book data type. If the book data is of another type, it can be displayed in units of a page and the reciter image specified by the user reads aloud the book data in his or her voice. During reading-aloud of the book data, the frames and page under display scroll in synchronism with the advance of the reading-aloud voice.

As described above, the electronic book device 1 can easily download and acquire desired book data and related voice data externally. Therefore, the user can visually enjoy reading the displayed book data in silence as well as hearing the book data being read aloud in a voice corresponding to the voice data.

When there is an arrival of a telephone call during reading-aloud of book data, this fact is reported and the reading-aloud of the book data is automatically stopped. Thus, the user can rapidly respond to the telephone call. The position where the reading-aloud of the book data stopped at the arrival of the telephone call is stored and when the telephone call ends the reproduction of the book data reopens automatically at the position where the telephone call stopped. Thus, no manual operations are required to reopen the book reading, conveniently.

When the book data is of the cartoon or comic type, the images of characters appearing in the book, sentences (letter data uttered by the images, and balloons that contain the letter data are displayed in units of a frame, the letter data in the displayed balloon is read aloud in the voices of the reciter images allocated to the characters. When reading-aloud the letter data in the balloon ends, the control passes automatically to a step to process another frame in a scrolling manner. Thus, it is unnecessary to turn the page/feed the frame, and the operation is simplified.

Since the book content represented by the book data is read aloud in the voices of the reciter images allocated to the book characters, one character can be discriminated from another and the user can enjoy reading the book without resorting to his or her eyesight.

Since the present letter data being read aloud is displayed so as to be distinguishable in color from other letter data, the data can be easily confirmed. For example, even when the displayed image and letters are alternately viewed, the present book data being read aloud at that time can be easily recognized when the user shifts his or her eyesight from the image to the letters to thereby provide comfortable reading.

In a book of a novel or story type, the letter data to be read aloud is displayed in units of a page, and read aloud in the voice of a reciter image specified by the user. When reading aloud the letter data is completed, a next page appears (is displayed by scrolling). Thus, it is unnecessary to turn the page, and the manual operations to be performed in the reading are simplified. The voices of reciter images can be specified by selecting the reciter images to be allocated to the characters appearing in the book and can also be heard. The user therefore can enjoy reading comfortably.

The present invention is not limited to the contents of the above embodiment and is modifiable without departing from the spirit and scope of the present invention. For example, a voice recognizer 2A may be provided that performs an analysis process including shortening a voice spectrum of a voice signal input by the voice input unit 14, causing a pattern of the voice signal to match with a reference pattern to recognize the voice, and then outputting a result of the voice recognition. For example, it may be arranged that when a callee's telephone terminal No. is to be dialed, his or her telephone number data and name stored in corresponding relationship in the internal RAM 7 are instead inputted in voice into the microphone 1C, and that the voice recognizer 2A specifies the callee in its voice recognition process and also specifies in voice the book data to be read aloud.

While in the embodiment book data is illustrated as being read aloud, for example, an electronic mail received externally via the communication I/F 9 may be read aloud in the voice of the reciter image delivered by the server 30.

In this case, if the CPU 2 receives the electronic mail (letter data) via the communication I/F 9, stores it in the mail data storage area 7*e* of the internal RAM 7, and causes a reciter image to read aloud the electronic mail, stored in the mail data storage area 7*e* by manipulating the input unit 3, in the reciter's voice represented by the voice data delivered by the server 30, the user can listen to the electronic book device 1 read the externally received electronic mail aloud.

In this case, the server 30 may prestore in the character image ROM 32B a plurality of different action images of each of the reciter images N21–N25 corresponding to letter data (words, a speech or a sentence of greeting) of a respective one of a plurality of electronic mails. The book device 1 can receive and store the plurality of different action images of each of the reciter images N21–N25 from the server 30. The book device 1 can then read and display sequentially on the display unit 4 the plurality of different actions of the reciter image in accordance with the letter data (text of the electronic mail stored in the mail data storage area 7*e* being read aloud in the voice of the reciter. For example, when the letter data of the electronic mail includes a sentence of greeting "Good morning", the reciter image N21 can be displayed so as to gesture "Good morning" while saying so.

A touch panel may be provided on each of the two display panels 1A and 1B of electronic book device 1 such that when one of the touch panels is depressed at any particular position, detailed data related to the depressed position is displayed on the other touch panel. For example, contents representing chapters of a book maybe provided so as to be displayed on one of the display panels. When a desired title of the contents is pressed, book data of a chapter indicated by the title may be displayed on the other display panel. In this case, turning the page in the electronic book device 1 is simplified to thereby enjoy more comfortable reading.

The wearable device 20 may include a headphone type book data reproducer with ear pads that include a receiving section which receives a memory card (external memory), and a voice producing unit 13 and a voice output unit 15 that cooperate to reproduce a voice that reads book data aloud. A plurality of desired book data can be downloaded from the host server 30 of the book data delivery center HS via the communication I/F 9 and stored on the memory card. Book data selected by the user can be read aloud in a voice corresponding to the selected voice data.

Also, when there arrives a telephone call during reading aloud of the book data in such headphone type book data reproducer, the CPU 2 generates a telephone-call arrival reporting command and a reproduction stop command to thereby cause the reproducer 20 to report the arrival of the telephone call, and to stop reading the book data aloud and display of the book data on the display unit 4 of the book device 50. At this time, the CPU 2 stores the position where the reproduction stopped in the incoming-call register 7*i* of the internal RAM 7. When the telephone call end, reading aloud the book data reopens at the position where the reading aloud of the book data stopped.

Thus, even the headphone type book data reproducer can download desired book data externally and store it on the memory card. The user can enjoy listening to the book being read aloud. When there is an arrival of a telephone call during reproduction of the book data, the telephone call is reported and reading the book aloud is automatically stopped. Thus, the user can rapidly respond to the telephone call. The position on a page where reading of the book data was stopped is stored when there is a telephone call and reproduction of the book data automatically reopens at that position when the telephone call ends. Thus, no manual operations are required when the reading reopens.

Provision of the timepiece 12 on the headphone type book data reproducer 60 and/or provision of the voice input unit 14 and rotary switch 11 on the electronic book device 50 are possible without departing from the scope of the present invention.

According to this embodiment, when delivery of book data and the images of reciters who are, for example, favorite famous persons, voice actors/actresses, animation characters, etc., is requested via the communication means by an external electronic book device, the host server can read out the book data, reciter images and corresponding voice data satisfying the request from among the plurality of such data stored in the storage means and send the data via the communication means to the external electronic book device. Thus, this process can be performed rapidly and easily. Thus, the user can anywhere acquire reciter images that read book data aloud and corresponding voice data, and reproduce the book data in the voices of the reciter images. The voices of the reciter images may additionally include those of animation characters.

According to this embodiment, when an external terminal (for example, a copyright holder terminal that has stored work data such as reciter images that read the content of an electronic book aloud, and corresponding voice data) sends those data via the network to the host server, the host server stores the received reciter images and voice data in corresponding relationship. When the host server is requested to deliver reciter images via the network from an external electronic book device, the host server reads out the requested reciter images and corresponding voice data and then sends those data to the external book device. Thus, the host server can rapidly and securely perform this process.

According to this embodiment, in the electronic book device connected via a network to the external book device delivery source the electronic book device can receive via the network from the external book device delivery source a plurality of book titles and a plurality of reciter images that read aloud the respective contents of books having those titles, and select a desired book title from among the received plurality of book titles and desired ones from the plurality of reciter images. The book device can further receive from the book data delivery source the book data specified by the desired book title, the specified reciter images and the corresponding voice data, and displays those data. The electronic book device can reproduce the contents of the book represented by the displayed book data in the voices of the displayed reciter images represented by the voice data. The reciter images include the images of famous persons, voice actors/actresses, etc. Thus, while the user is watching the delivered book data and the desired character images, the user can listen to the desired reciter images reading aloud the delivered book data in their peculiar comfortable voices.

What is claimed is:

1. An electronic book apparatus comprising:

a display;

display control means for causing the display to simultaneously display a plurality of different book titles corresponding respectively to a plurality of books;

book selecting means for selecting a desired one of the plurality of books;

receiving means for requesting an external book delivery system to deliver data electronically to the book apparatus, and for receiving the data from the external book delivery system, said data including a text of the selected desired book which includes a plurality of different characters, and images of a plurality of different readers corresponding to voices for reading out relevant parts of the book text;

display control means for causing the display to display images of the plurality of characters and the images of the plurality of readers;

user-operable allocation means for utilizing the displayed images of the plurality of characters and the displayed images of the plurality of readers to select a reader to correspond to each character of the plurality of characters;

display control means for causing the display to display the received book text and the images of the plurality of characters, after the selection of the reader for each of the plurality of characters; and read means for reading out relevant parts of the book text corresponding to the plurality of characters displayed with the book text such that a part corresponding to said each character of the plurality of characters is read out in the voice of the reader selected to correspond to the character.

2. The electronic book apparatus of claim 1, wherein the display displays the book text such that a currently-read-out part of the book text is distinguishable from a remainder of the displayed book text.

3. The electronic book apparatus of claim 1, wherein each of the readers is a famous person or a voice actor or actress.

4. The electronic book apparatus of claim 1, wherein the book text comprises at least one word and a balloon surrounding the at least one word.

5. An electronic book apparatus comprising:

a display;

display control means for causing the display to display images of a plurality of different characters appearing in respective relevant parts of a test of a book, and images of a plurality of different readers corresponding to voices for reading out the relevant parts of the book text;

user-operable allocation means for utilizing the displayed images of the plurality of characters and the displayed images of the plurality of readers to select a reader to correspond to each character of the plurality of characters;

display control means for causing the display to display the images of the plurality of characters and the book text, after the selection of the reader for each of the plurality of characters; and read means for reading out the relevant parts of the book text corresponding to the plurality of characters displayed with the book text such that a part corresponding to said each character of the plurality of characters is read out in the voice of the reader selected to correspond to the character.

6. The electronic book apparatus of claim 5, wherein the display displays the book text such that a currently-read-out part of the book text is distinguishable from a remainder of the displayed book text.

7. The electronic book apparatus of claim 5, wherein each of the readers is a famous person or a voice actor or actress.

8. The electronic book apparatus of claim 5, wherein the book text comprises at least one word and a balloon surrounding the at least one word.

9. An electronic book apparatus comprising:

a display;

determination means for determining a type of an electronic book to be read as one of a first type and a second type, said first type of electronic book including book data comprising: book text, an image of at least one character appearing in the book text, and an image of at least one reader corresponding to a voice for reading out at least one relevant part of the book text corresponding to the at least one character, and said second type of electronic book including book data comprising: book text, an image of at least one narrator, and an image of at least one reader corresponding to a voice for reading out at least one relevant part of the book text corresponding to the at least one narrator;

read control means for:

(i) when the electronic book is determined to be of the first type, causing the display to temporarily display the image of the at least one character and the image of the at least one reader, and then displaying and reading out the at least one relevant part of the book text corresponding to the at least one character in the voice of the at least one reader; and (ii) when the electronic book is determined to be of the second type, causing the display to temporarily display the image of the at least one narrator and the image of the at least one reader, and then displaying and reading out the at least one relevant part of the book text corresponding to the at least one narrator in the voice of the at least one reader.

10. The electronic book apparatus of claim 9, further comprising display control means for causing the display to display the relevant part of the book text such that a currently-read-out part of the book text is distinguishable from a remainder of the displayed book text.

11. The electronic book apparatus of claim 9, wherein said at least one reader is a famous person or a voice actor or actress.

12. The electronic book apparatus of claim 9, wherein the book text of the electronic book of the first type comprises at least one word and a balloon surrounding the at least one word.

13. An electronic book apparatus comprising:

a display;

display control means for causing the display to simultaneously display a plurality of different book titles corresponding respectively to a plurality of books;

book selecting means for selecting a desired one of the plurality of books;

receiving means for requesting an external book delivery system to deliver data electronically to the book apparatus, and for receiving the data from the external book delivery system, said data including a text of the selected desired book, an image of a character appearing in the text, and a voice that reads out the text;

storage control means for causing a storage device to store the book text, the image of the character, and the voice;

reading-out control means for (i) causing the display to display a first predetermined part of the book text and the image of the character, and for reading out the first predetermined part of the book text in the voice stored in the storage device after the book text and the image of the character are displayed, and then (ii) acquiring a second predetermined part of the book text from the storage device, causing the display to display the second predetermined part of the book text, and reading out the second predetermined text part of the book text in the voice stored in the storage device.

14. The electronic book apparatus of claim 13, wherein the book text comprises at least one word and a balloon surrounding the at least one word.

* * * * *